US012792289B2

United States Patent

(12) United States Patent
Uchida et al.

(10) Patent No.: US 12,792,289 B2
(45) Date of Patent: Nov. 10, 2026

(54) INFORMATION PROCESSING SYSTEM, INFORMATION PROCESSING DEVICE, AND IMAGE DISPLAY DEVICE

(71) Applicant: MAXELL, LTD., Kyoto (JP)

(72) Inventors: Yoshiharu Uchida, Kyoto (JP); Osamu Kawamae, Kyoto (JP); Nobuaki Kabuto, Kyoto (JP); Yoshinori Okada, Kyoto (JP)

(73) Assignee: Maxell, Ltd., Kyoto (JP)

( * ) Notice: Subject to any disclaimer, the term of this patent is extended or adjusted under 35 U.S.C. 154(b) by 257 days.

(21) Appl. No.: 18/572,557

(22) PCT Filed: Jun. 22, 2021

(86) PCT No.: PCT/JP2021/023592
§ 371 (c)(1),
(2) Date: Dec. 20, 2023

(87) PCT Pub. No.: WO2022/269753
PCT Pub. Date: Dec. 29, 2022

(65) Prior Publication Data

US 2024/0289083 A1 Aug. 29, 2024

(51) Int. Cl.
*G06F 3/14* (2006.01)
*G06F 3/147* (2006.01)
(Continued)

(52) U.S. Cl.
CPC ............ *G06F 3/1454* (2013.01); *G06F 3/147* (2013.01); *G06T 5/50* (2013.01); *G06T 5/90* (2024.01);
(Continued)

(58) Field of Classification Search
None
See application file for complete search history.

(56) References Cited

U.S. PATENT DOCUMENTS

2011/0304646 A1 12/2011 Kato
2014/0232747 A1 8/2014 Sugimoto et al.
(Continued)

FOREIGN PATENT DOCUMENTS

EP 3 009 915 A1 4/2016
JP 2011-258120 A 12/2011
(Continued)

OTHER PUBLICATIONS

International Search Report of PCT/JP2021/023592 dated Aug. 17, 2021.

(Continued)

*Primary Examiner* — Yi Wang
(74) *Attorney, Agent, or Firm* — Mattingly & Malur, PC

(57) ABSTRACT

An information processing system includes an HMD equipped with a camera and a smartphone-configured to operate and display an application that is application software, the information processing system has an information communication cooperation function between the HMD and the smartphone, the HMD photographs and reads a screen of the smartphone by the camera, recognizes a display position and a display size of the read screen of the smartphone as a display area, and displays an image of the screen of the smartphone in the recognized display area.

18 Claims, 24 Drawing Sheets

(51) Int. Cl.

| | |
|---|---|
| ***G06T 5/50*** | (2006.01) |
| ***G06T 5/90*** | (2024.01) |
| ***G06T 7/60*** | (2017.01) |
| ***G06T 7/73*** | (2017.01) |

(52) U.S. Cl.

CPC .................. *G06T 7/60* (2013.01); *G06T 7/73* (2017.01); *G06T 2200/24* (2013.01)

(56) References Cited

U.S. PATENT DOCUMENTS

| | | | |
|---|---|---|---|
| 2015/0015459 | A1 | 1/2015 | Cho et al. |
| 2016/0034039 | A1 | 2/2016 | Maeda et al. |
| 2016/0055641 | A1* | 2/2016 | Faynshteyn ......... G06F 3/04815 345/632 |
| 2017/0092010 | A1 | 3/2017 | Hato |
| 2017/0206673 | A1 | 7/2017 | Kawamoto |
| 2018/0164589 | A1 | 6/2018 | Watanabe et al. |
| 2018/0366089 | A1* | 12/2018 | Sekiguchi ................ G09B 5/02 |
| 2019/0212962 | A1* | 7/2019 | Iwasaki ................. G06F 3/1259 |
| 2020/0184219 | A1 | 6/2020 | Mugura et al. |

FOREIGN PATENT DOCUMENTS

| | | | |
|---|---|---|---|
| JP | 2014-157482 | A | 8/2014 |
| JP | 2014-186361 | A | 10/2014 |
| WO | 2015/189973 | A1 | 12/2015 |
| WO | 2016/021252 | A1 | 2/2016 |
| WO | 2016/194844 | A1 | 12/2016 |
| WO | 2019/044536 | A1 | 3/2019 |

OTHER PUBLICATIONS

Extended European Search Report received in corresponding European Application No. 21947040.8 dated Mar. 28, 2025.

* cited by examiner

INFORMATION PROCESSING SYSTEM, INFORMATION PROCESSING DEVICE, AND IMAGE DISPLAY DEVICE

TECHNICAL FIELD

The present invention relates to an information processing system, an information processing device, and an image display device that include an information processing device that displays an application (abbreviation of application software) and an image display device that is mainly worn on a head and displays an image, and display a display screen of the information processing device in a screen of the image display device.

BACKGROUND ART

An information processing device having a function of displaying a held application, a communication cooperation function with other devices, and the like is particularly called a smartphone (hereinafter, referred to as a smartphone), and is generally palm-sized and capable of displaying operation screens of various applications and various types of information on a display screen, and is widely used with good usability. A folded smartphone, a roll-type smartphone, and the like also appear, and the screen of the smartphone is enlarged, and a plurality of applications can be simultaneously displayed.

In addition, image display devices that display virtual objects have been widely used. An example is a Head Mounted Display (hereinafter, referred to as HMD) that is mounted on a head and includes a display unit, a camera, and the like. The HMD is an image display device that displays a virtual object while recognizing an entity of a real space in three dimensions by using an augmented reality (AR) technology in which the virtual object on a virtual space including another image or an image made of computer graphics (CG) or the like is reflected and expanded in the real space.

Furthermore, in recent years, an HMD that displays a screen of a smartphone in cooperation with the smartphone has appeared. For example, Patent Literature 1 describes "an information processing device including an imaging unit, a position/posture calculation unit that calculates a position and a posture of an external image display device in a first reference coordinate system of the information processing device on a basis of an image obtained by photographing the image display device by the imaging unit, a position/posture conversion unit that converts the position and the posture of the image display device in the first reference coordinate system into the position and the posture of the information processing device in a second reference coordinate system of the image display device, and an embedding position calculation unit that calculates a position at which screen information related to the information processing device is embedded in a screen of the image display device on a basis of the position and the posture of the information processing device in the second reference coordinate system". In other words, mutual positional relationship and posture between an HMD and a smartphone are grasped on the basis of the image obtained by photographing the HMD from the camera mounted on the smartphone, and the screen information transmitted from the smartphone is superimposed and displayed on the reproduction screen of the HMD in an appropriate posture at an appropriate position on a content reproduction screen being viewed. As a result, since only the smartphone exists in the same position and posture as in the real world in the content reproduction screen, a user can perform a screen operation of the smartphone while wearing the HMD.

CITATION LIST

Patent Literature

Patent Literature 1: International Patent Publication No. WO2016/021252

SUMMARY OF INVENTION

Technical Problem

In Patent Literature 1, although displaying screen information of a smartphone in an overlapping manner in a display screen of an HMD is described, it is necessary that the entire screen of the smartphone is always located in the display screen of the HMD, and there is a problem that a degree of freedom in use is low and convenience is difficult.

In addition, when the screen of the smartphone is displayed on the HMD as the virtual object, it is necessary to select what application content is displayed at which position of the HMD, but there is a problem that the selection operation of the related art is not visual, complicated, and difficult to perform. Furthermore, in a case where the screen image of the HMD and the screen image of the smartphone are not harmonized with each other in terms of contrast when the screen of the smartphone is inserted into and displayed on the screen of the HMD as the image, for example, in a case where the surroundings are bright such as outdoors, the luminance of the inserted image of the smartphone is low with respect to the bright HMD screen image (transmissive image), and in a case where the surroundings are dark such as nighttime, the contrast between the dark HMD screen image and the inserted image of the smartphone is too strong, and there is a problem that the eyes are likely to be tired.

In consideration of the above problems, the present invention can easily and conveniently display a screen of an application or the like selected by an information processing device such as a smartphone at a display position and a display size suitable for a display screen of an image display device such as an HMD. In addition, the degree of freedom in the preferred display arrangement is high, and operability that is convenient for the user is enabled. Furthermore, the present invention provides an information processing system, an information processing device, and an image display device capable of achieving a balance in contrast between a display screen image of the information processing device inserted into a display screen of the image display device and a display screen image of the image display device.

Solution to Problem

An outline of a representative invention among the inventions disclosed in the present application will be briefly described as follows.

(1) An information processing system including:

an image display device equipped with a camera; and an information processing device configured to operate and display an application that is application software, in which the information processing system has an information communication cooperation function between the image display device and the information processing device, and the image display device photographs and reads a screen of the information processing device by the camera, recognizes a display position and a display size of the read screen of the information processing device as a display area, and displays an image of the screen of the information processing device in the recognized display area.

(2) The information processing system according to (1), in which the information processing device selects an application screen which is a screen of the application or a partial area of the application screen, and the image display device photographs and reads the selected application screen or partial area by the camera, recognizes a display position and a display size of the read application screen or partial area as the display area, and displays an application screen image which is an image of the selected application screen or partial area in the recognized display area.

(3) The information processing system according to (2), in which the information processing device selects the application screen or the partial area of the application screen, and generates and displays a specific pattern having a range of the selected application screen or partial area, and the image display device photographs and reads the generated and displayed specific pattern by the camera, recognizes a display position and a display size of the read specific pattern as the display area, and displays an application screen image that is an image of the selected application screen or partial area in the recognized display area.

(4) The information processing system according to (3), in which the information processing device makes the specific pattern to be generated and displayed translucent.

(5) The information processing system according to (3), in which the image display device generates an area frame indicating a range of the specific pattern generated and displayed by the information processing device, and displays the area frame on a display screen of the image display device.

(6) The information processing system according to (2), in which the information processing device activates and displays display application switching software that switches a plurality of the applications on a display screen of the information processing device, selects an icon of each application indicated on the activated and displayed display application switching software, and thereby selects the application displayed on the image display device.

(7) The information processing system according to (2), in which the information processing device selects the application screen or the partial area of the application screen, the image display device photographs the selected application screen or partial area by the camera, recognizes a display position and a display size of the photographed application screen or partial area as the display area, and displays an application screen image which is an image of the selected application screen or partial area in the recognized display area, the information processing device selects another application screen to be displayed on the image display device or another partial area of another application screen, and the image display device photographs the selected another application screen or the partial area of the another application screen by the camera, recognizes a display position and a display size of the photographed another application screen or partial area of the another application screen as another display area, and displays another application screen image that is an image of the another application screen or the partial area of the another application screen image selected by the information processing device in the recognized another display area.

(8) The information processing system according to (2), in which the image display device or the information processing device identifies a harmony degree of contrast between the application screen image inserted into the display screen of the image display device and the image of the display screen of the image display device, and the information processing device performs image quality adjustment of the application screen such that the contrast is harmonized when disharmony of the contrast is identified by the identified contrast harmonization degree.

(9) The information processing system according to (8), in which the image display device includes an illuminance sensor configured to detect brightness around a field of view, and the information processing device adjusts luminance of the application screen according to an output from the illuminance sensor.

(10) The information processing system according to (2), in which when the application screen image selected by the information processing device is displayed in the display area of the image display device, the information processing device selects whether to always display or display for each trigger notification, and in a case where the always display is selected, the image display device always displays the application screen image, and in a case where the display for each trigger notification is selected, the image display device starts or stops the display of the application screen image according to trigger notification information of start or stop of display generated by the information processing device.

(11) An information processing device having a function of operating and displaying an application that is application software and a communication cooperation function of information with an image display device equipped with a camera, in which the information processing device selects a screen of the information processing device displayed on the image display device, causes the image display device to recognize a display position and a display size of a screen of the information processing device photographed and read by the camera as a display area, supplies an image of a screen of the information processing device displayed on the image display device to the image display device, and controls the image display device to display the supplied image of the screen of the information processing device in the recognized display area.

(12) The information processing device according to (11), in which the information processing device selects an application screen which is a screen of the application or a partial area of the application screen, causes the image display device to recognize a display position and a display size of the application screen or partial area photographed and read by the camera as the display area, supplies an application screen image, which is an image of the application screen or the partial area displayed on the image display device, to the image display device, and controls the image display device to display the application screen image that is the image of the supplied selected application screen or partial area in the recognized display area.

(13) The information processing device according to (12), in which the information processing device selects the application screen or the partial area displayed on the image display device, generates and displays a specific pattern having a range of the selected application screen or partial area, causes the image display device to recognize the specific pattern photographed and read by the camera as the display area, supplies an application screen image, which is an image of the application screen or partial area displayed on the image display device, to the image display device, and controls the image display device to display an application screen image, which is the supplied image of the application screen or partial area, in the recognized display area.

(14) The information processing device according to (13), in which the information processing device makes the specific pattern to be generated and displayed translucent.

(15) The information processing device according to (13), in which the information processing device causes the image display device to generate an area frame indicating a range of the specific pattern.

(16) The information processing device according to (12), in which the information processing device activates and displays display application switching software that switches a plurality of the applications on a display screen of the information processing device, and selects an icon of each application indicated on the activated and displayed display application switching software, and thereby selects the application displayed on the image display device.

(17) The information processing device according to (12), in which the information processing device selects the application screen or the partial area of the application screen to be displayed on the image display device, causes the image display device to recognize a display position and a display size of the application screen or partial area photographed and read by the camera as the display area, supplies an application screen image, which the image of the application screen or partial area displayed on the image display device, to the image display device, and controls the image display device to display the supplied application screen image in the recognized display area, and further, the information processing device selects another application screen or another partial area of another application screen to be displayed on the image display device, causes the image display device to recognize a display position and a display size of the another application screen or another partial area of the another application screen photographed and read by the camera as another display area, supplies an application screen image an application screen image, which the image of the another application screen or partial area of the another application screen displayed on the image display device, to the image display device, and controls the image display device to display the supplied another application screen image in the recognized another display area.

(18) The information processing device according to (12), in which when the information processing device or the image display device identifies disharmony of contrast between the application screen image inserted into the screen of the image display device and the image of the display screen of the image display device, the information processing device adjusts an image quality of the application screen such that the contrast is harmonized.

(19) The information processing device according to (18), in which the information processing device adjusts luminance of the application screen according to an output from an illuminance sensor of the image display device configured to detect brightness around a field of view.

(20) The information processing device according to (12), in which when the application screen image selected by the information processing device is displayed in the display area of the image display device, the information processing device selects whether the application screen image is always displayed or is displayed for each trigger notification, and in a case where the always display is selected, the information processing device controls the image display device to always display the application screen image, and in a case where the display for each trigger notification is selected, the information processing device generates trigger notification information of display start or display stop, and controls the image display device to start or stop the display of the application screen image according to the generated trigger notification information.

(21) An image display device having a communication cooperation function for information with an information processing device configured to operate and display an application that is application software, and a camera in which the image display device photographs and reads, by the camera, a screen of the information processing device selected by the information processing device, recognizes a display position and a display size of the read screen of the information processing device as a display area, and displays an image of the screen of the information processing device selected by the information processing device in the recognized display area.

(22) The image display device according to (21), in which the image display device photographs and reads, by the camera, an application screen that is a screen of the application or a partial area of the application screen selected by the information processing device, recognizes a display position and a display size of the read application screen or partial area as the display area, and displays an application screen image, which is an image of the application screen or the partial area selected by the information processing device, in the recognized display area.

(23) The image display device according to (22), in which the image display device photographs and reads, by the camera, a specific pattern generated and displayed on the application screen or the partial area by the information processing device, recognizes a display position and a display size of the read specific pattern as the display area, and displays an application screen image, which is an image of the application screen or partial area selected by the information processing device, in the recognized display area.

(24) The image display device according to (23), in which the image display device photographs and reads the translucent specific pattern generated and displayed by the information processing device by the camera.

(25) The image display device according to (23), in which the image display device generates an area frame indicating a range of the specific pattern generated and displayed by the information processing device, and displays the area frame on a display screen of the image display device.

(26) The image display device according to (22), in which the image display device displays an application screen of an application of the icon selected from among icons of respective applications shown on display application switching software activated and displayed by the information processing device or an application screen image that is an image of a partial area.

(27) The image display device according to (22), in which the image display device photographs and reads, by the camera, the application screen or the partial area selected by the information processing device, recognizes a display position and a display size of the read application screen or partial area as the display area, and displays an application screen image, which is an image of the application screen or the partial area, in the recognized display area, and further, the image display device photographs and reads, by the camera, another application screen or another partial area of the another application screen selected by the information processing device, recognizes, as another display area, a display position and a display size of the read another application screen or another partial area of the another application screen, and displays an application screen image which is an image of another application screen selected by the information processing device or a partial area of another application screen in the recognized another display area.

(28) The image display device according to (22), in which when the information processing device or the image display device identifies disharmony of contrast between the application screen image inserted into the screen of the image display device and the image of the display screen of the image display device, the image display device displays the application screen image whose image quality adjusted by the information processing device so that the contrast is harmonized.

(29) The image display device according to (28), in which the image display device includes an illuminance sensor configured to detect brightness around a field of view, and displays the application screen image whose luminance adjusted by the information processing device according to an output from the illuminance sensor.

(30) The image display device according to (22), in which when the application screen image selected by the information processing device is displayed in the display area of the image display device, the image display device always displays the application screen image in a case where the always display is selected by the information processing device, and in a case where the display for each trigger notification is selected by the information processing device, the image display device starts or stops the display of the application screen image according to the display start or display stop trigger notification information generated by the information processing device.

Advantageous Effects of Invention

By using the technology of the present invention, it is possible to easily and conveniently display a screen of an application or the like selected by an information processing device such as a smartphone at a display position and a display size suitable for a display screen of an image display device such as an HMD, and it is possible to realize an information processing system, an information processing device, and an image display device that have a high degree of freedom in suitable display arrangement, enable operability convenient for a user, and further achieve harmony of contrast between a display screen image of the information processing device inserted into the display screen of the image display device and a display screen image of the image display device.

Problems, configurations, and effects other than those described above will be clarified by the following description of embodiments.

DESCRIPTION OF EMBODIMENTS

Hereinafter, an example of an embodiment of the present invention will be described with reference to the drawings. In the present embodiment, a comfortable life and convenience of a user are secured by advanced technologies by providing the following technologies. The realization of this video information device cooperation system contributes to the "9. Establish the basis of industry and technological innovation" of the sustainable development goals (SDGs) proposed by the United Nations.

An information processing system including an image display device equipped with a camera and an information processing device that operates and displays an application (abbreviation of application software) and the like, and including an information communication cooperation function between the image display device and the information processing device, in which a Head Mounted Display (HMD, hereinafter referred to as HMD) will be described as a specific example of the image display device, and a portable smartphone (abbreviation of smartphone) will be described as a specific example of the information processing device. Examples of the HMD include a type (so-called optical see-through type) in which an entity in front of an eye is visually recognized through a lens while a virtual object is displayed on a display unit, and a type (so-called video see-through type and shielding type) in which a video obtained by photographing an entity of a real space with a camera or content such as a movie, music, or a game is displayed on a display unit provided on a front surface of a head, and a user can see the displayed entity or virtual object closely.

Figure 1A:
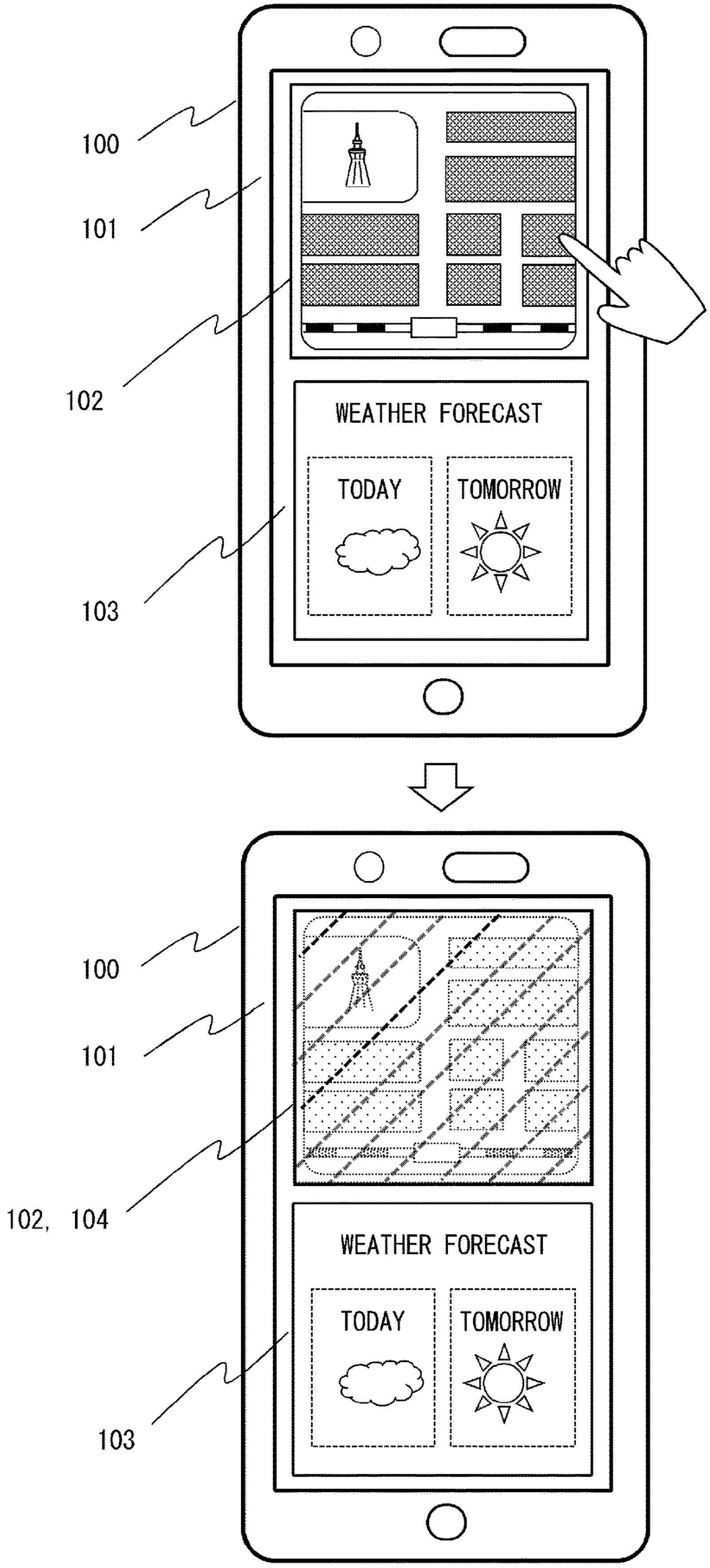
FIG. 1A is an example of a diagram schematically illustrating an appearance of an embodiment of an information processing system, an information processing device, and an image display device according to the present embodiment.
Figure 1B:
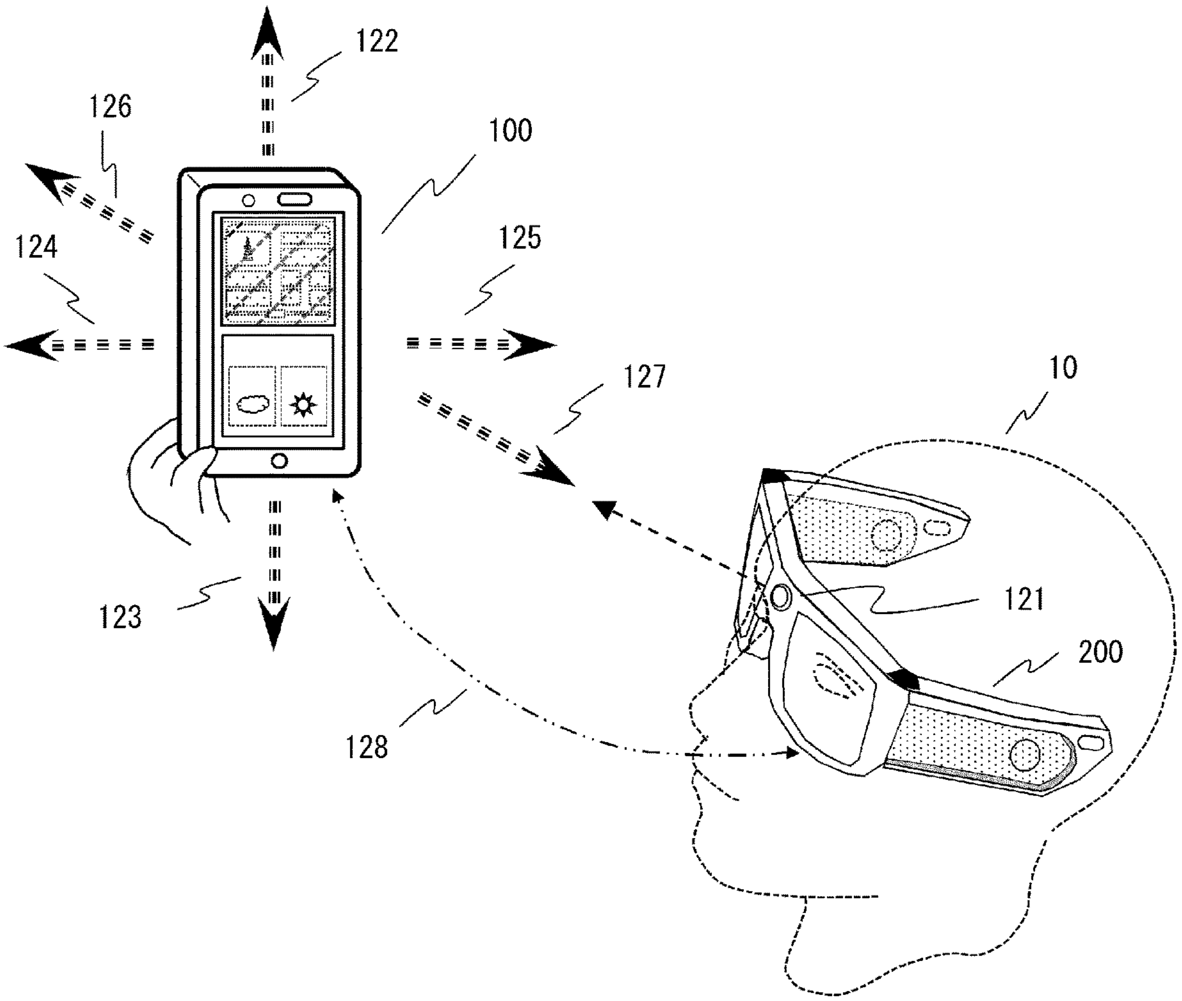
FIG. 1B is an example of a diagram schematically illustrating an appearance of the embodiment of the information processing system, the information processing device, and the image display device according to the present embodiment.
Figure 1C:
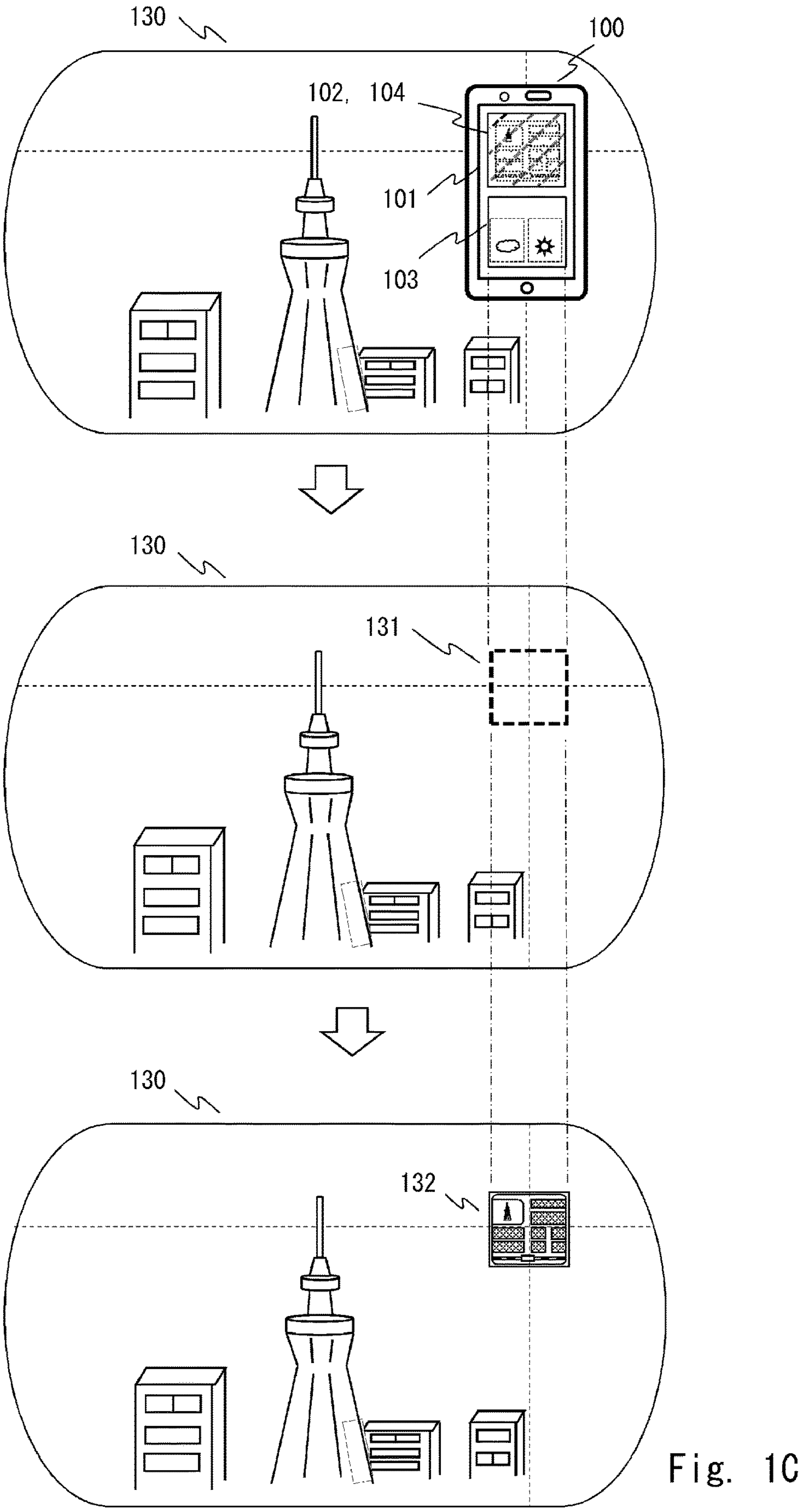
FIG. 1C is an example of a diagram schematically illustrating the appearance of an embodiment of the information processing system, the information processing device, and the image display device according to the present embodiment.
Figure 1D:
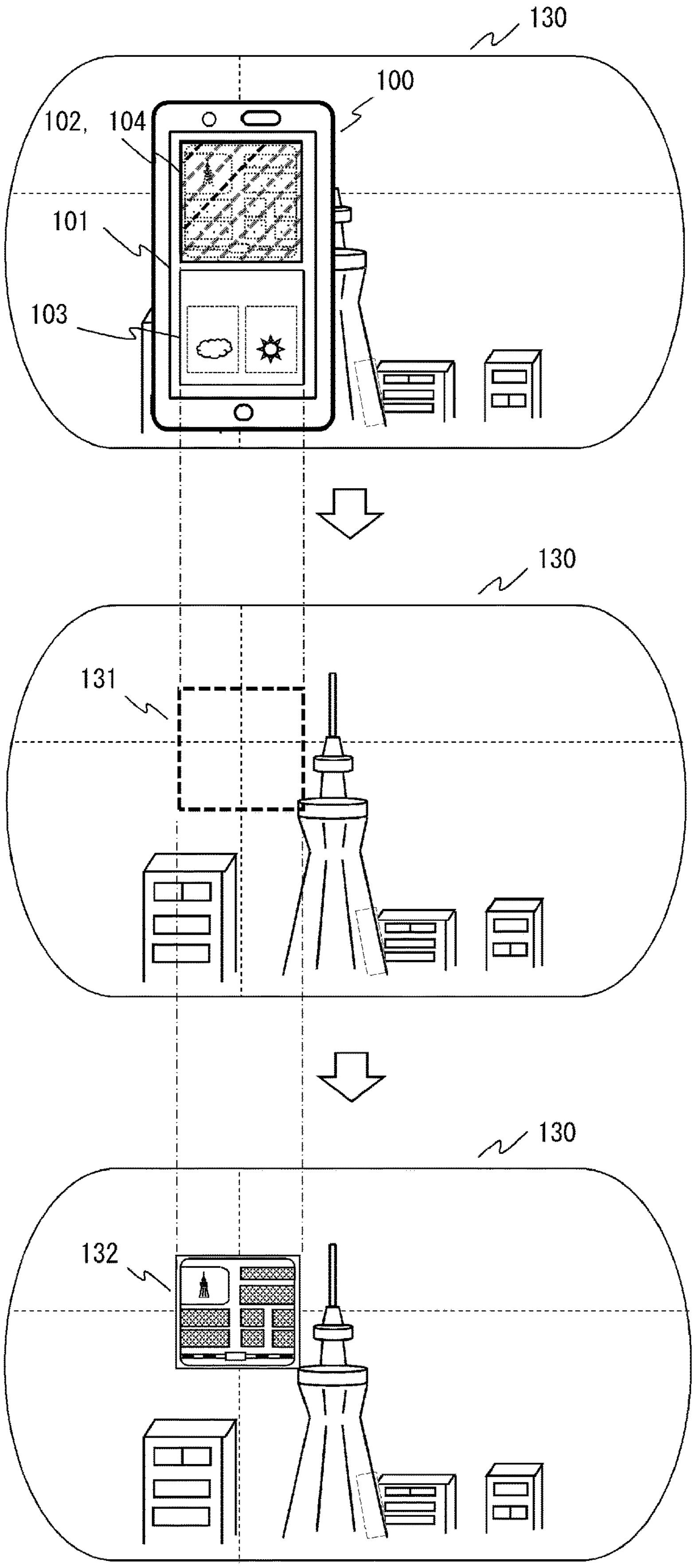
FIG. 1D is an example of a diagram schematically illustrating the appearance of the embodiment of the information processing system, the information processing device, and the image display device according to the present embodiment.

FIGS. 1A to 1D are examples of diagrams schematically illustrating an appearance of an embodiment of an information processing system, an information processing device, and an image display device according to the present embodiment. FIG. 1A illustrates a smartphone 100 on a display surface side on which an application stored in the smartphone 100 is operated and displayed, and FIG. 1B illustrates a state in which the user 10 wears an HMD 200 having information communication cooperation with the holding smartphone 100 as indicated by a two-dot chain line 128 on the head, and FIGS. 1C and 1D illustrate the display screen 130 of the HMD 200. Hereinafter, a case will be described, in which a screen of the application (hereinafter, referred to as an application screen, that is, the application screen refers to, for example, a screen of an application displayed on the information processing device such as the smartphone 100) on a display screen 101 of the smartphone 100 is inserted into and displayed on the display screen of the HMD 200 as a virtual object, and the application screen of the smartphone 100 can be visually recognized together with the surrounding scenery or image content in the HMD 200.

In FIG. 1A, the smartphone 100 displays an application screen 102 of a map application and an application screen 103 of a weather application, which are examples of the application, on the display screen 101. For example, in a case where the application screen 102 of the map application is selected as the application screen to be inserted into and displayed on the HMD 200, the user 10 long presses or touches (hereinafter, referred to as touch) the application screen 102 of the map application with a finger, whereby the application screen 102 of the map application is selected as the application screen to be inserted into and displayed on the HMD 200. In this manner, the information processing device selects the screen of the information processing device displayed on the image display device by the user input.

Further, a specific pattern 104 indicated by an oblique dotted line may be generated and displayed on the application screen 102 of the selected map application. The displayed specific pattern 104 indicates a display area of an application screen to be inserted into and displayed on the HMD 200 when the user 10 wearing the HMD 200 views the specific pattern 104 on the display screen of the smartphone 100 at a suitable position. Note that a method of selecting the application screen to be inserted into and displayed on the HMD 200 may be a touch such as deep pressing or strong pressing, or may be an operation via the operation input interface of the smartphone 100. In addition, the specific pattern may be made semitransparent, and in this case, it is possible to visually recognize an original application screen while displaying the specific pattern, and convenience can be improved.

As illustrated in FIG. 1B, when the screen of the smartphone 100 enters the display screen of the HMD 200 worn by the user 10, a camera 121 of the HMD 200 photographs and captures the specific pattern 104 of the smartphone 100. In the HMD 200, the specific pattern 104 moving in the up, down, left, right, front, and back directions like reference signs 122 to 127 is photographed and read by the camera 121, and the position of the read specific pattern 104 is recognized as the display position of the application screen displayed on the display screen of the HMD 200. Here, reference signs 126 and 127 denote cases of moving in far and near directions, and when the specific pattern 104 is photographed and read by the camera 121, the display size can be enlarged or reduced. Then, the size of the display area of the read specific pattern 104 is recognized as the display size of the application screen displayed on the display screen of the HMD 200. As described above, in the image display device, the user 10 holds the selected screen of the information processing device over the camera 121 to photograph and read the screen by the camera 121, and recognizes the read display position and display size of the screen of the information processing device as the display area.

FIG. 1C illustrates a display seen in the HMD when the screen of the smartphone 100 is introduced into the HMD 200. The upper part of FIG. 1C is a diagram when the camera mounted on the HMD 200 captures that the screen of the smartphone 100 has entered the display range of the HMD 200. The smartphone 100 displays the specific pattern 104 on the application screen 102 of the selected map application.

In the HMD 200, the screen displayed on the smartphone 100 is captured by the camera 121, and as illustrated in the middle part of FIG. 1C, an area frame 131 indicating the area of the read specific pattern 104 is generated. Note that a thick line or the like indicating the area may be generated in the smartphone 100 in advance together with the specific pattern 104. On the display screen 130 of the HMD 200, the generated area frame 131 is displayed in accordance with the movement of the smartphone 100, on which the specific pattern 104 is displayed, in the up, down, right, left, far and near directions. The user 10 moves the smartphone 100 in the up, down, left, right, far and near directions while looking at the area frame 131 indicating the area of the specific pattern, and determines the display position and the display size suitable for the HMD display of the application screen. Then, as illustrated in the lower part of FIG. 1C, an image 132 of the application screen of the smartphone 100 is displayed at a predetermined position in the screen of the HMD 200 with a predetermined size.

As described above, by moving the area frame 131 to be displayed while viewing the screen of the smartphone 100 through a field of view from the HMD 200, it becomes easy to confirm while finely adjusting when determining that "display at this position in this size". Furthermore, when measuring up, down, left, right, far, and near distances, a distance between the HMD 200 and the smartphone 100 may be measured by a distance sensor mounted on the HMD 200, and the result may be used together. In this way, the image display device photographs and reads the image by the camera 121 by the user 10 holding the screen of the selected information processing device over a suitable position.

Here, a correspondence relationship between the image captured by the camera mounted on the HMD 200 and the area frame displayed on the screen of the HMD 200 may be stored in advance by adjustment at the time of product shipment or the like. Furthermore, in a case where the screen of the smartphone 100 does not face directly in front of the HMD 200, the screen of the smartphone 100 is viewed obliquely. In such a case, the inclination of the smartphone is recognized by grasping the shape of the smartphone 100, and the screen to be displayed on the HMD 200 is corrected and displayed in the same shape as when the screen is viewed from the front. By using such a method, it is possible to display the smartphone screen at an appropriate position and correct distortion of the screen.

Next, FIG. 1D illustrates a case where a display position and a display size suitable for display are different from those in FIG. 1C, compared to the case of FIG. 1C. The user 10 can arrange the smartphone 100 at any display position or any display size in the screen of the HMD 200 by adjusting the arrangement of the upper, lower, left, right, far, and near. Since the area frame 131 is displayed on the display screen of the HMD 200, it is possible to freely and easily determine a display position and a display size suitable for insertion display of the application screen, such as a place that does not interfere with the image in the display screen, while easily viewing the image in the display screen. Note that the display position in the screen of the HMD 200 may be determined by a specific pattern without the area frame.

Here, as the operation in the lower part of FIG. 1C and the lower part of FIG. 1D, the HMD 200 transmits information of the display area determined by the determined display position and display size to the smartphone 100. The smartphone 100 receives the display area information, generates image data of the application screen to be displayed in the display area, and transmits the image data to the HMD 200. In the HMD 200, an image (simply referred to as an image or an application screen image, that is, the application screen image refers to, for example, an application screen displayed on an image display device such as the HMD 200) of the received application screen, for example, the image 132 of the application screen 102 of the map application is displayed in a predetermined display area. In this manner, the image display device displays the image of the selected screen of the information processing device in the recognized display area. Note that the image 132 of the application screen 102 of the map application may be displayed as it is first selected on the smartphone 100, for example, or the resolution of the image of the application screen 102 of the map application may be converted from the number of pixels or the resolution of the HMD 200. In addition, in a case where the display screen for output to another device is set, the image data may be transmitted.

Furthermore, after the display position and the display size in the HMD 200 are fixed, the display position of the image on the application screen of the smartphone 100 may be displayed at the same position in the frame of the display screen 130 of the HMD 200, may be displayed so as to be affixed to a position (in FIG. 1C, the upper right of the tower) fixed to the background position, or may be selectable by the user 10. In that case, in a case where the user 10 moves the head, in the former case, the application screen image of the smartphone 100 is displayed at the same position on the screen of the HMD 200, and in the latter case, the application screen image moves in the screen of the HMD but is displayed at a position where the positional relationship with the background does not change. Furthermore, in a case where the head is moved or the surrounding scenery changes, and it is desired to move the display position of the application screen image, the position of the application screen image displayed on the HMD can be moved by an operation of holding and moving the application screen image displayed on the HMD 200 by an operation on the screen of the HMD 200, for example, a gesture operation, or an operation of selecting and moving the application screen image by a line of sight.

As described above, when the application screen of the smartphone 100 is displayed on the display screen of the HMD 200, the display position and the display size defining the display area of the application screen can be determined with a high degree of freedom by moving the smartphone 100 up, down, left, and right, or approaching or moving away from the smartphone 100 in a state where the smartphone is held over the HMD 200. Furthermore, after the display position and the display size of the application screen are set, the application screen of the smartphone 100 can be visually recognized on the display screen of the HMD 200 even when the smartphone 100 is out of the field of view, for example, when the smartphone 100 is put in a pocket or a bag, or when the smartphone 100 is placed at a position that cannot be reached by hand. Alternatively, the application of the smartphone 100 set to be displayed on the screen of the HMD 200 may be deleted from the application screen, and the remaining application of the smartphone 100 may be expanded and displayed on the screen. Furthermore, not only the application screen of the smartphone 100 is constantly displayed on the display screen of the HMD 200, but also, for example, in the case of a phone application, when there is an incoming call, the application screen of the smartphone 100 can be displayed at the determined display position on the display screen of the HMD 200 with the display size.

Note that, in this embodiment, the application of the smartphone 100 has been described as an example. However, the application is not limited to the smartphone 100, and may be an application of a smart watch, a screen of a car navigation system, or the like as long as the application can be connected to and cooperate with another device.

Figure 2A:
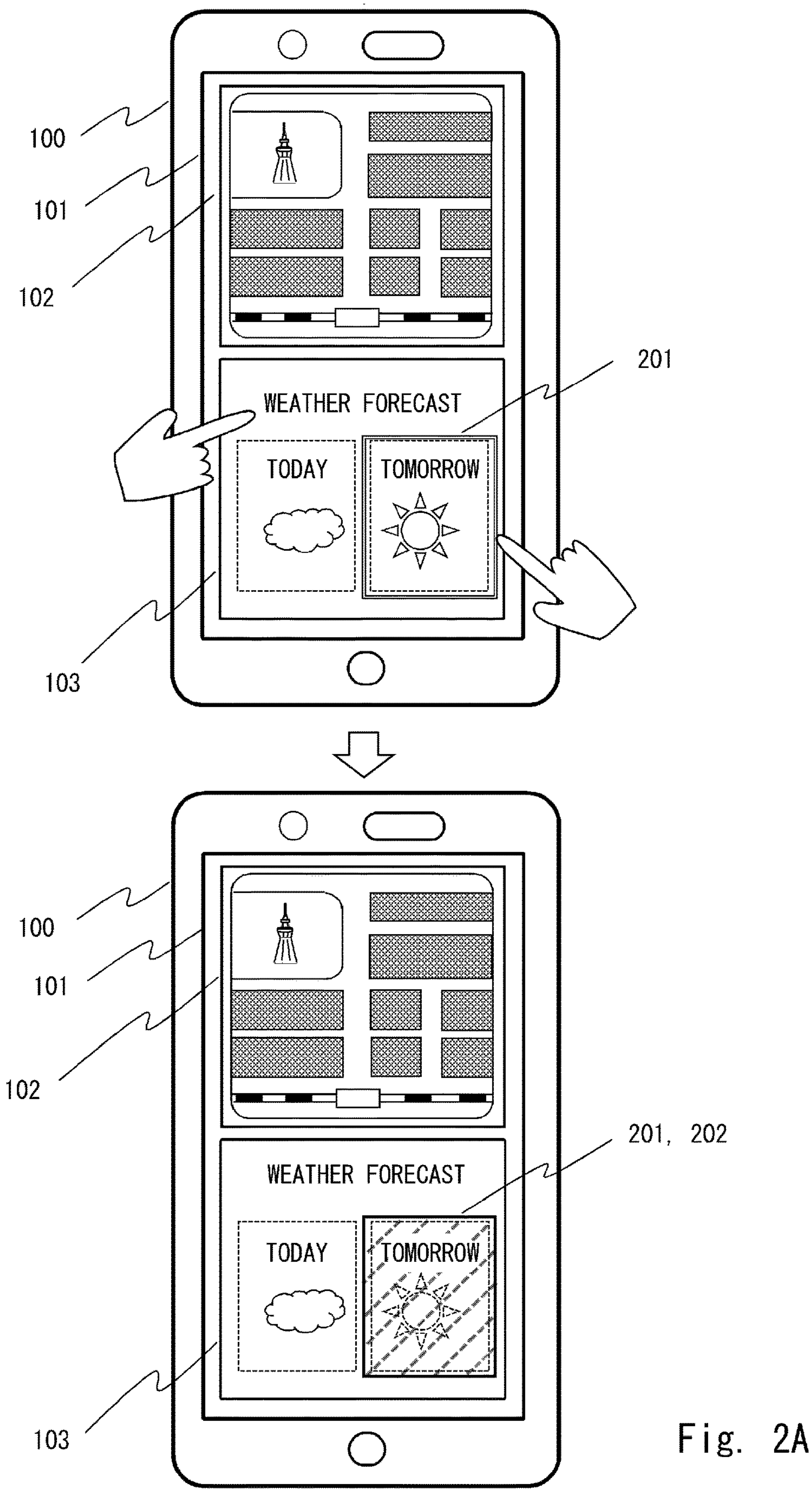
FIG. 2A is another example of a diagram schematically illustrating the appearance of the embodiment of the information processing system, the information processing device, and the image display device according to the present embodiment.
Figure 2B:
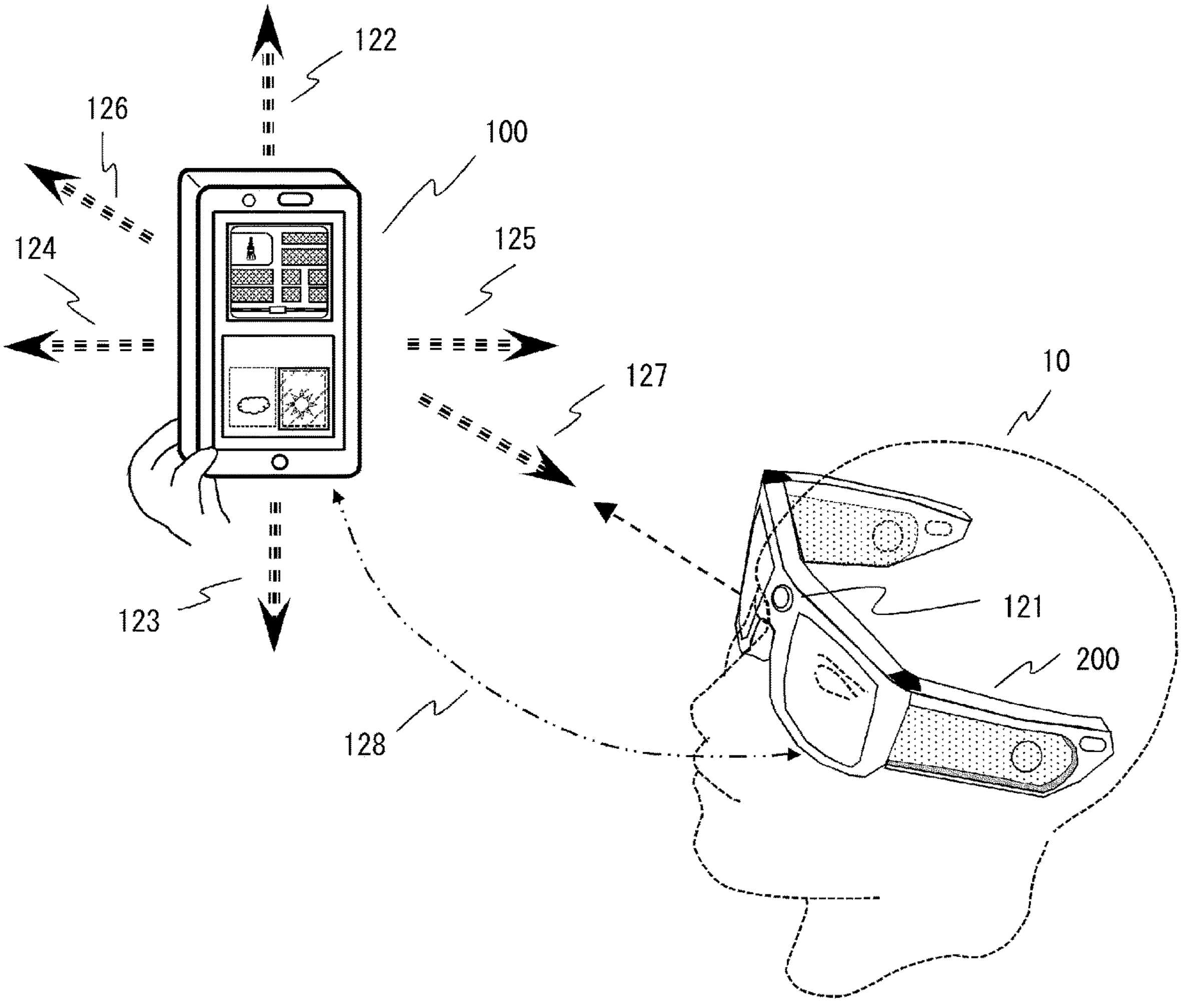
FIG. 2B is another example of a diagram schematically illustrating the appearance of the embodiment of the information processing system, the information processing device, and the image display device according to the present embodiment.
Figure 2C:
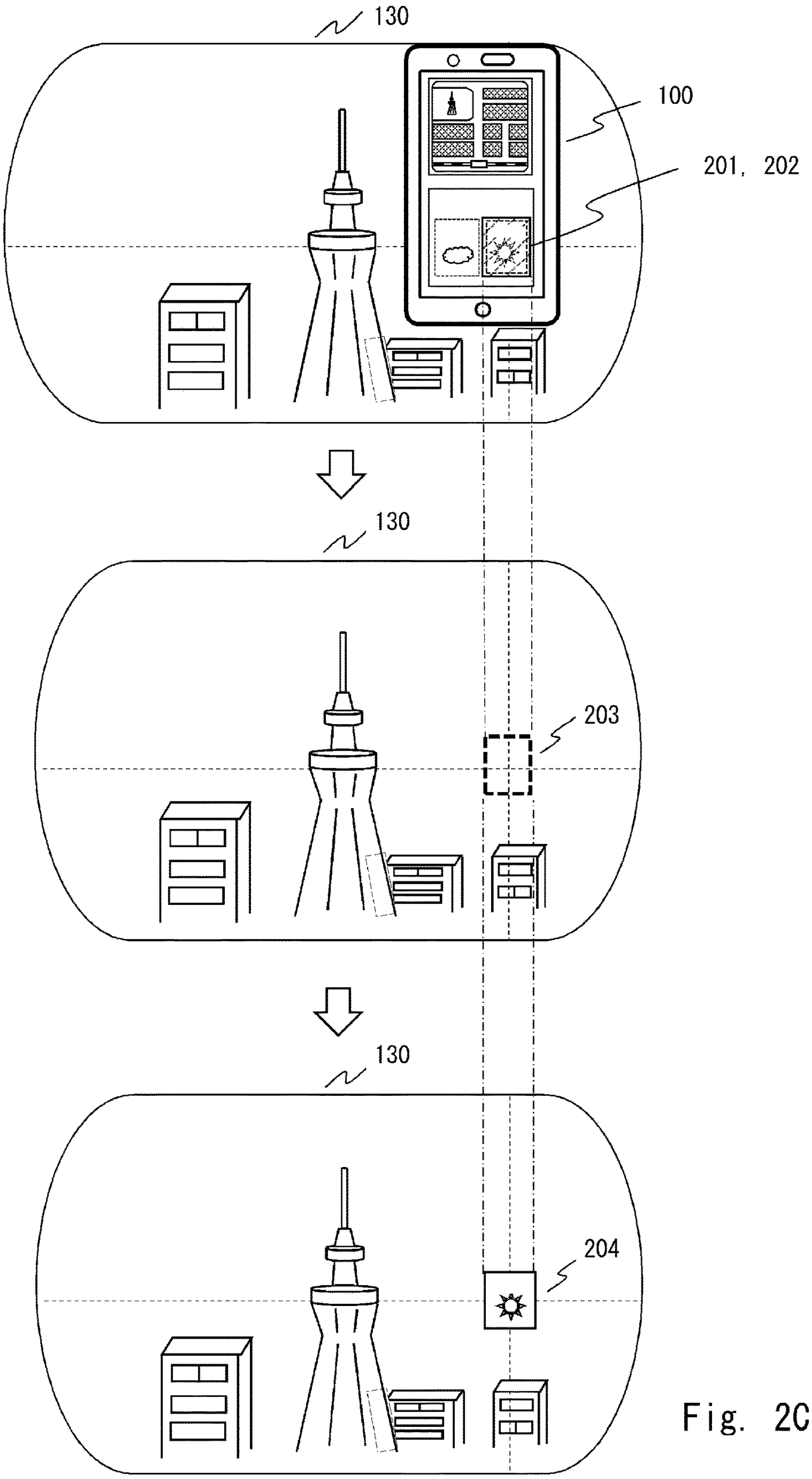
FIG. 2C is another example of a diagram schematically illustrating the appearance of the embodiment of the information processing system, the information processing device, and the image display device according to the present embodiment.

Next, a case where a part of the application screen of the smartphone 100 is selected and displayed on the HMD 200 will be described with reference to FIGS. 2A to 2C. Note that, in FIGS. 2A to 2C, portions illustrated in FIGS. 1A to 1D and denoted by the same reference numerals have the same operation as the operation already described in FIGS. 1A to 1D, and thus detailed description thereof will be omitted. FIGS. 2A, 2B, and 2C correspond to FIGS. 1A, 1B, and 1C, respectively. FIG. 2A illustrates the smartphone 100 on the display surface side in which the application stored in the smartphone 100 is operated and displayed. FIG. 2B illustrates a state in which the user 10 holds the smartphone 100 in the hand and wears the HMD 200 having information communication cooperation with the smartphone 100 on the head. FIG. 2C illustrates an example of the screen of the smartphone 100 and the display screen 130 of the HMD 200 viewed through the HMD 200.

In FIG. 2A, in a case where the screen to be inserted into and displayed on the HMD 200 is a part of the application screen, for example, an area 201 indicating the tomorrow's weather in the application screen 103 of the weather application, the user 10 first touches the application screen 103 of the weather application with a finger to select the weather application, and further selects the area 201 indicating the tomorrow's weather which is a part of the application screen 103 of the weather application to perform partial area designation. Alternatively, the area 201 indicating tomorrow's weather, which is a part of the application screen 103 of the weather application, may be surrounded by a fingertip to perform partial area designation. By these area designations, a display screen of a partial application to be inserted into and displayed on the HMD 200 is selected. For example, as illustrated in the upper part of FIG. 2A, the area 201 indicating the tomorrow's weather is selected in the application screen 103 of the weather application. In this manner, the smartphone 100 may select a partial area of the application screen. Furthermore, as illustrated in the lower part of FIG. 2A, a specific pattern 202 indicated by an oblique dotted line is generated and displayed on the screen of the selected partial application, for example, on the area 201 indicating tomorrow's weather.

When the smartphone 100 enters the display screen of the HMD 200, as illustrated in FIG. 2B, the camera 121 of the HMD 200 photographs and captures the display of the specific pattern 202. In the HMD 200, a specific pattern 202 moving in up, down, left, and right, front, and rear directions 122 to 127 is photographed and read by the camera 121, and the position and size of the read specific pattern 202 are recognized as the display position of the application screen displayed on the display screen of the HMD 200. In particular, in the HMD 200, the specific pattern 202 moving in the front and rear directions, that is, the far and near directions 126 and 127 is photographed and read by the camera 121, and the size of the read specific pattern 202 is recognized as the display size of the application screen displayed on the display screen of the HMD 200. Further, the HMD 200 generates an area frame 203 indicating the range of the read specific pattern 202.

As illustrated in the upper part of FIG. 2C, the specific pattern 202 is displayed on the display screen 130 of the HMD 200. At this time, as illustrated in FIG. 2B, the area frame 203 having the same size as the area of the specific pattern captured by the camera 121 is displayed in accordance with the movement of the smartphone 100 in the up, down, left, right, far, and near directions. The user 10 moves the smartphone 100 in the up, down, left, right, far, and near directions while viewing the area frame 203 indicating the range of the specific pattern, and determines the display position and the display size suitable for the HMD display of the partial screen of the application. When the display position and the display size are determined, information of screen display of a part of the display application is obtained from the smartphone 100 and displayed on the screen of the HMD 200 as illustrated in FIG. 2C.

The information regarding the display image is similar to the description of FIG. 1, and the HMD 200 transmits information of the determined display position and display size to the smartphone 100, and the smartphone 100 generates image data of a partial application screen to be displayed on the HMD 200 in accordance with the acquired information of the display area, and transmits the image data to the HMD 200. The HMD 200 displays the partial application screen image from the received image data, for example, an image 204 of the area 201 indicating the tomorrow's weather, which is a partial screen of a weather application, in a predetermined display area. Therefore, as in the case of FIG. 1, the partial screen of the application can be displayed in a predetermined display area of the display screen of the HMD 200, and an effect similar to that in the case of FIG. 1 can be obtained. In this manner, the image of the partial area of the application screen is also referred to as an application screen image. That is, the application screen image which is the partial area refers to, for example, an image of a selected partial area of the application screen displayed on the image display device such as the HMD 200.

Figure 3A:
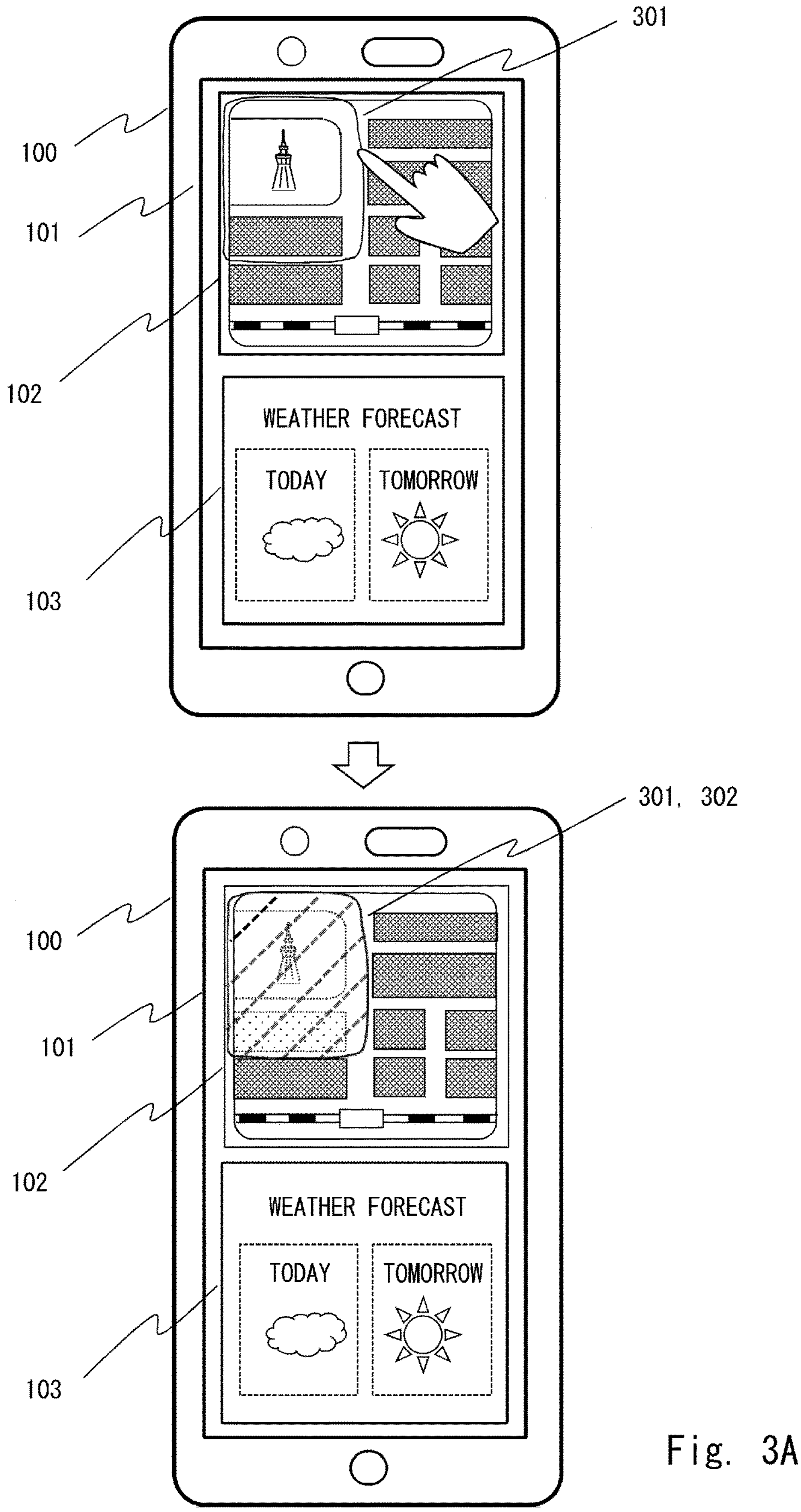
FIG. 3A is an example of a diagram illustrating a case where a partial area of an application screen is selected in the information processing system, the information processing device, and the image display device according to the present embodiment.

FIG. 3A illustrates an example of a method of enclosing a part of an application screen with a fingertip and performing partial area designation. As illustrated in FIG. 3A, the vicinity of the tower, which is a part of the application screen 102 of the map application, is surrounded by a fingertip, and a surrounded area 301 is selected. Further, a specific pattern 302 indicated by an oblique dotted line is displayed on the surrounded area 301. Alternatively, the surrounded area may be displayed by a frame such as a thick line. The subsequent operation is similar to that illustrated in FIGS. 1 and 2.

Figure 3B:
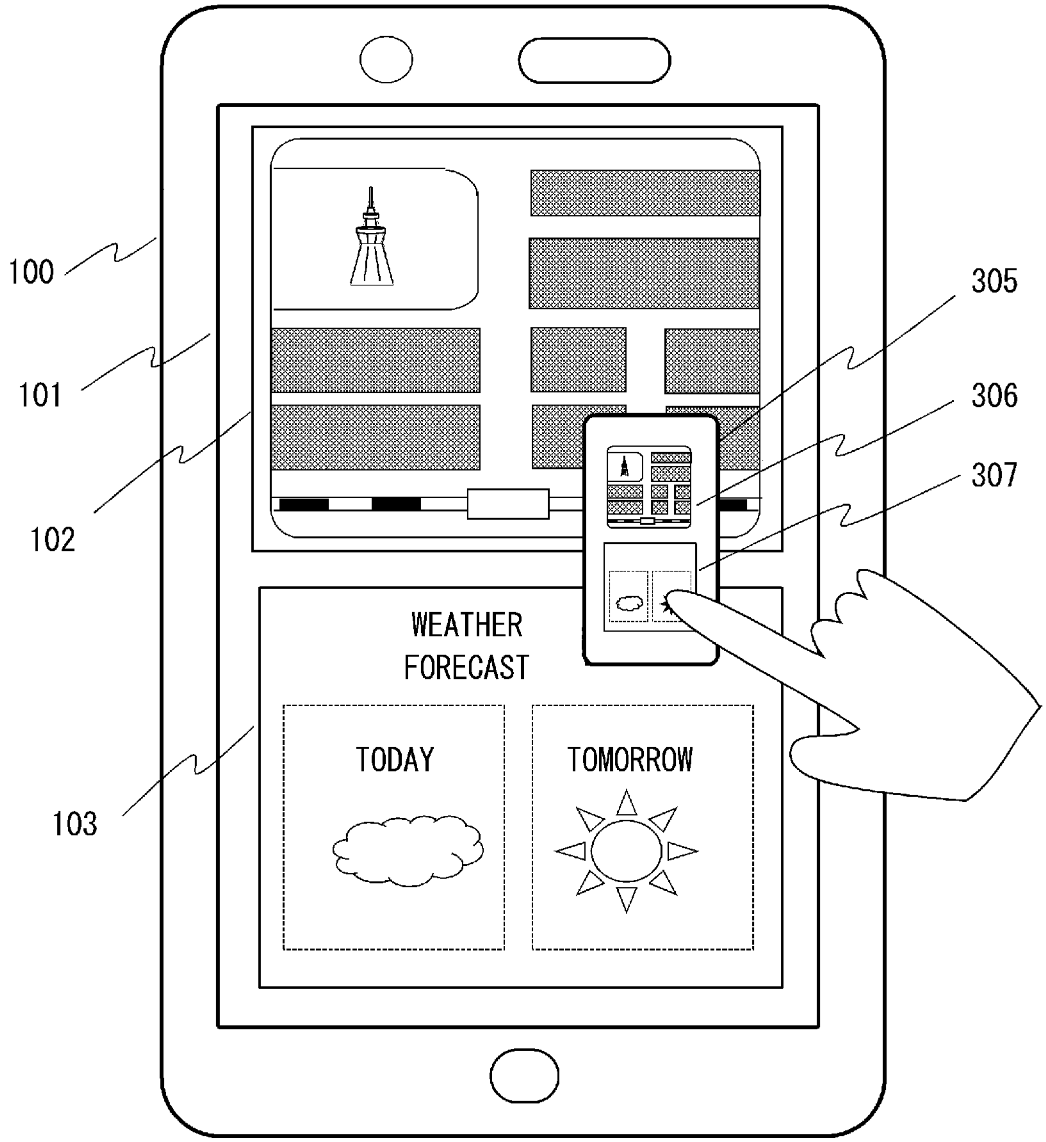
FIG. 3B is an example of a diagram illustrating a case where an application displayed on the information processing device is selected by icon designation in the information processing system, the information processing device, and the image display device according to the present embodiment.

Furthermore, FIG. 3B is an example of a diagram for describing a case of selecting an application to be displayed on the HMD 200 using display application switching software capable of switching a plurality of applications. As illustrated in FIG. 3B, the display application switching software 305 capable of switching a plurality of applications is activated on the smartphone 100 and displayed on the display screen. This is because when an instruction is directly given to an application screen on the smartphone 100, there is a case where an operation (for example, designation of a specific place in the map application) related to the operation of the application is performed, and the operation is likely to be confused. Therefore, the display application switching software is activated, and any one of icons obtained by reducing the display of the plurality of applications displayed on the display application switching software 305, for example, an icon 306 of the map application or an icon 307 of the weather application is touched with the fingertip to select the application displayed on the HMD 200. In this case, the operation of selecting an application can be easily performed visually. Note that the selection operation of the application icon may be another method other than touching with the fingertip, for example, inputting the application name by voice.

Figure 4:
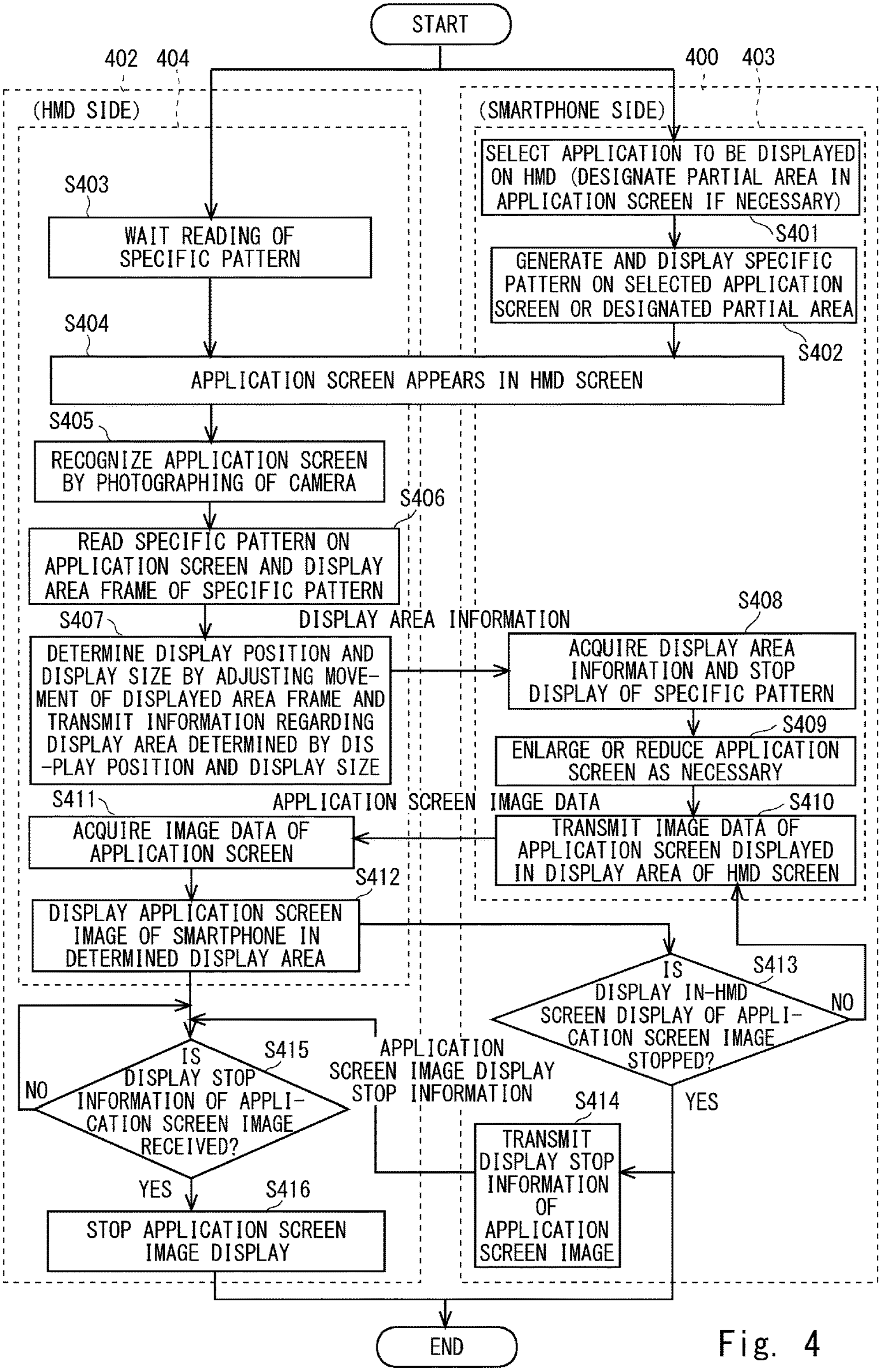
FIG. 4 is an example of a flowchart for explaining basic operations of the information processing system, the information processing device, and the image display device according to the present embodiment.

FIG. 4 is an example of a flowchart for explaining basic operations of the information processing system, the information processing device, and the image display device according to the present embodiment. In FIG. 4, on the right smartphone 100 side, an application to be displayed on the display screen of the HMD 200 is selected, and if necessary, a partial screen (partial area) in the application screen is designated (S401). Further, the specific patterns 104 and 202 are displayed on the selected application screen or the screen of the designated partial area of the application screen (S402). Meanwhile, on the HMD 200 side, a mode of waiting for reading the specific patterns 104 and 202 displayed on the smartphone 100 is activated (S403). In this state, when the application screen of the smartphone 100 appears in the screen of the HMD 200 (S404), the HMD 200 side photographs and recognizes the application screen with the camera 121 (S405), reads the specific patterns 104 and 202 on the application screen, and displays the area frames 131 and 203 indicating the ranges of the specific patterns 104 and 202 on the display screen of the HMD 200 (S406). Furthermore, the user 10 performs display position and size adjustment by movement of the smartphone 100 while viewing the displayed area frames 131 and 203. When a suitable display position and display size for displaying the application screen or the screen of the partial area of the application screen in the HMD screen are determined, information of the HMD 200 regarding the display area determined by the display position and the display size is transmitted to the smartphone 100 (S407). On the smartphone 100 side, the display area information is acquired, and the display of the specific patterns 104 and 202 is stopped (S408). Next, the user pinches in and out the application screen of the smartphone 100 as necessary, thereby enlarging or reducing the application screen displayed on the HMD 200 (S409). Then, the image data of the application screen generated in accordance with the display size is transmitted to the HMD 200 (S410). The HMD 200 side receives and acquires the image data of the application screen (S411), and displays the application screen image of the smartphone 100 in a predetermined display area (S412). (here, in a case where the characters of the application screen image of the smartphone 100 displayed on the HMD 200 are small and difficult to see, or in a case where necessary information is not included, the operation of S409 is repeated (not illustrated).)

Next, the user 10 selects whether to always display the in-HMD screen display of the application screen image on the smartphone 100 side or to display the in-HMD screen display by a predetermined trigger (S413). When the always display (N in S413) is selected, the image data for display is continuously sent from the smartphone 100 to the HMD 200. When the temporary stop of the HMD image display is set (Y in S413), display stop information of the application screen image is transmitted from the smartphone 100 to the HMD 200 (S414). When receiving the image display stop information of the application screen (S415), the HMD 200 stops the display of the application screen image on the HMD screen (S416). Here, in a case where the user 10 desires to stop the display of the application screen image after the always display is selected, the smartphone 100 is instructed to stop the display of the application screen image by the operation from the HMD 200 (not illustrated).

According to the above sequence, it is possible to easily display the application screen image of the smartphone 100 at a suitable display position and display size in the display screen of the HMD 200. Note that a portion surrounded by dotted lines 400 indicates a processing sequence in the smartphone 100, and a portion surrounded by dotted lines 402 indicates a processing sequence in the HMD 200. Furthermore, a portion surrounded by dotted lines 403 indicates a processing sequence up to the in-HMD screen display setting of the application screen image on the smartphone 100 side, and a portion surrounded by dotted lines 404 indicates a processing sequence up to the in-HMD screen display setting of the application screen image on the HMD 200 side.

Figure 5:
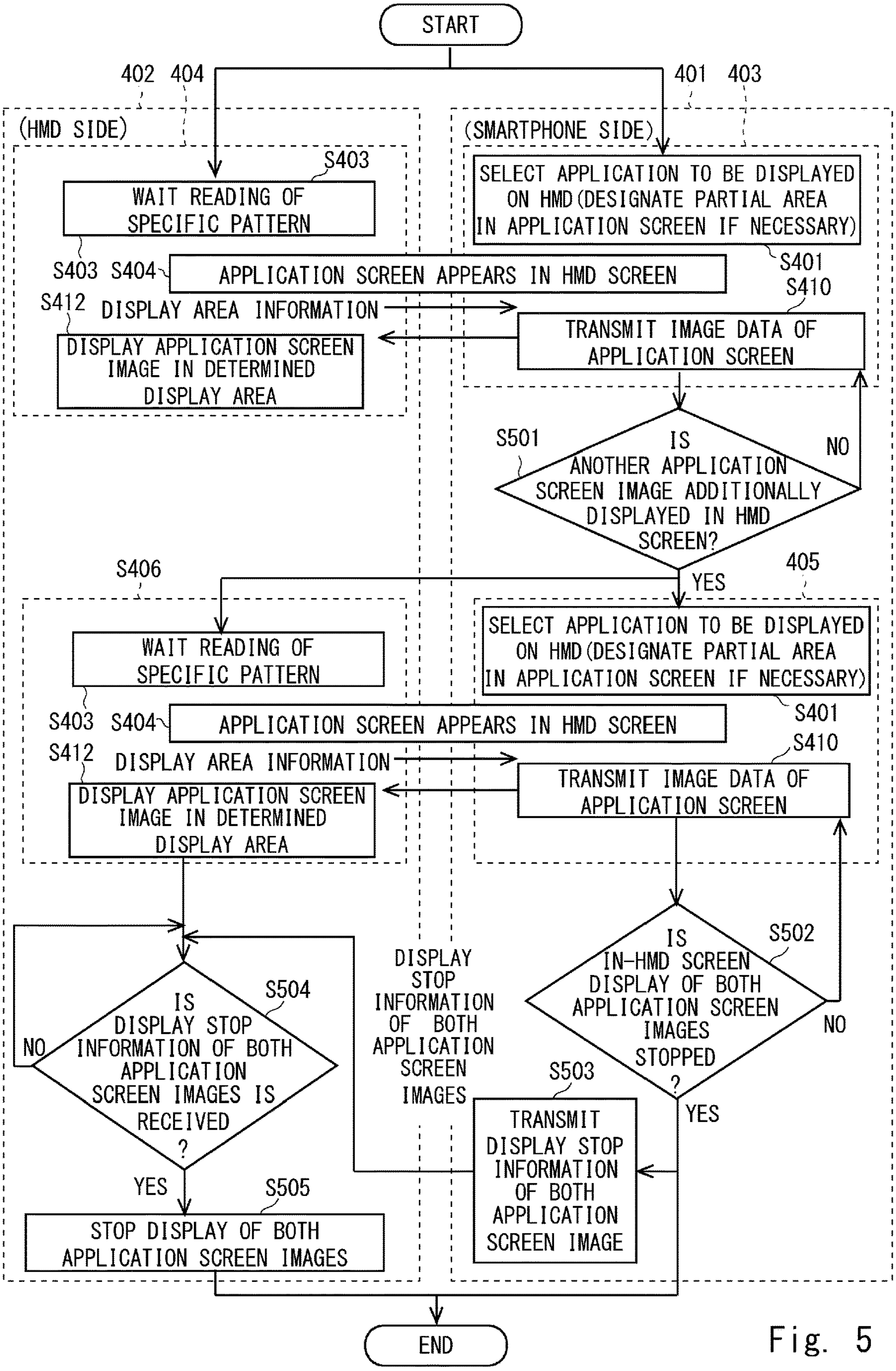
FIG. 5 is an example of a flowchart illustrating a display operation of a plurality of applications in the information processing system, the information processing device, and the image display device according to the present embodiment.

FIG. 5 illustrates an example of a case where a plurality of application screen images are displayed on the HMD screen in the information processing system, the information processing device, and the image display device according to the present embodiment. Here, a case where two first and second applications are displayed on the HMD screen will be described. Note that, in FIG. 5, portions illustrated in FIG. 4 and denoted by the same reference numerals have the same operation as the operation already described in FIG. 4, and thus detailed description thereof will be omitted. In FIG. 5, the processing sequence of displaying the first application screen image of the smartphone 100 in the HMD screen is similar to that described in FIG. 4, and is performed in the processing sequences of the portions surrounded by dotted lines 403 and 404, and the first application screen image of the smartphone 100 is displayed in a suitable display area on the HMD screen. Next, when it is set that another second application screen image is additionally displayed in the HMD screen on the smartphone 100 side (Y in S501), the processing sequence of the portion surrounded by the dotted lines 405 and 406, which is the same processing sequence as the processing sequence of the portion surrounded by the dotted lines 403 and 404, is executed. Then, in addition to the first application screen image of the smartphone 100, the second application screen image of the smartphone 100 is displayed in a display area suitable for display in the HMD screen. Here, whether to always display the in-HMD screen display of both the first and second application screen images on the smartphone 100 side or to display the in-HMD screen display by a predetermined trigger is selected (S502). When the always display (N in S502) is selected, image data for display is continuously sent from the smartphone 100 to the HMD 200. When the stop of the HMD image display is set (Y in S502), the smartphone 100 side transmits display stop information of both application screen images to the HMD 200 (S503). When the display stop information of both the application screen images is received on the HMD 200 side (S504), the display of both the first and second application screen images on the HMD screen of the smartphone 100 is stopped (S505). Therefore, according to the above sequence, both the first and second application screen images of the smartphone 100 can be easily and conveniently displayed at a display position and a display size suitable for the display screen of the HMD. In the case of two or more applications, the HMD display processing of the second application screen image may be continuously repeated. In addition, here, an example has been described in which whether to always display two applications or to display for each trigger is selected together, but another setting may be selected for each application. In this case, for example, the display method of the first application may be selected before S501.

Figure 6A:
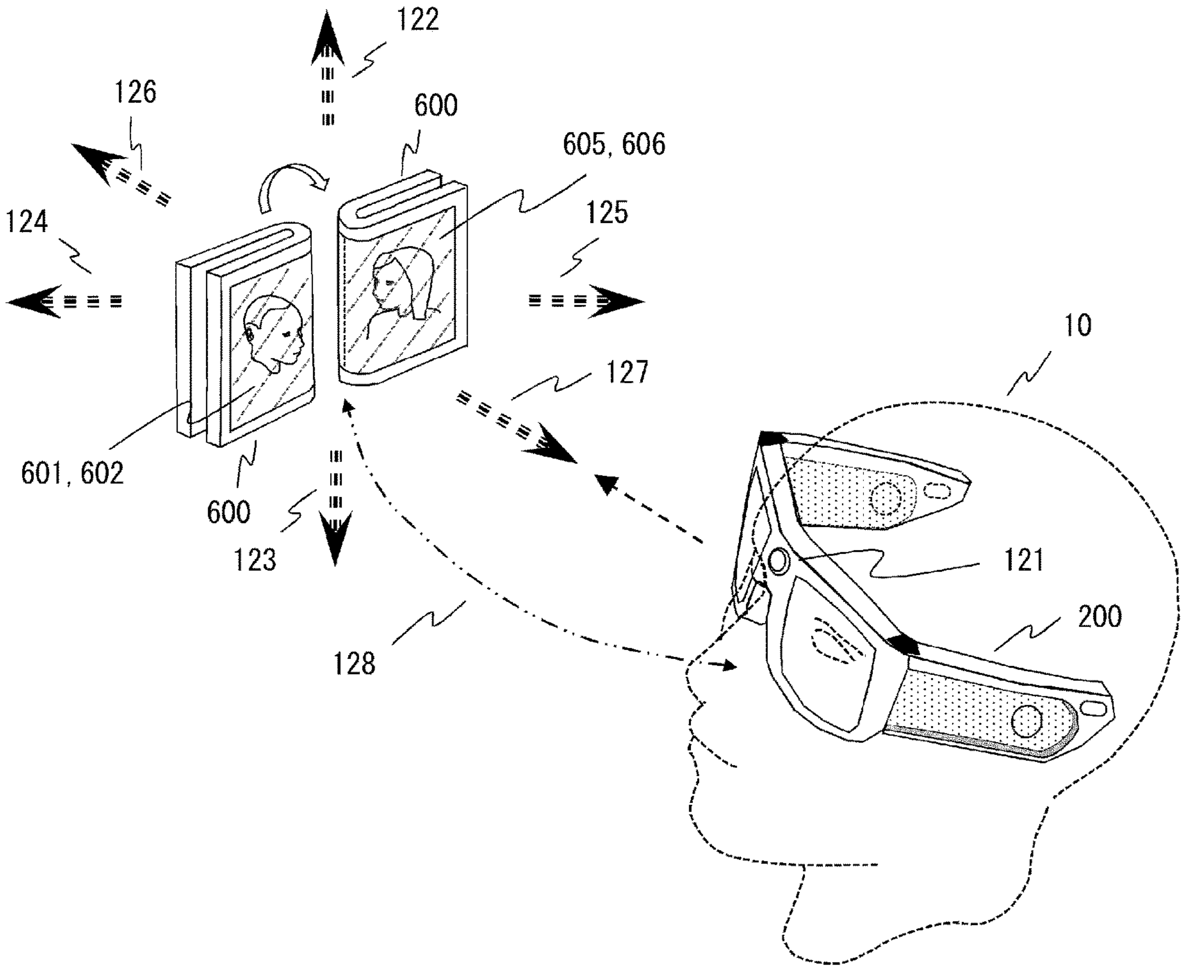
FIG. 6A is an example of a diagram schematically illustrating the appearance of the operation of the information processing device when left and right folding screens of a foldable smartphone are displayed in the information processing system, the information processing device, and the image display device according to the present embodiment.
Figure 6B:
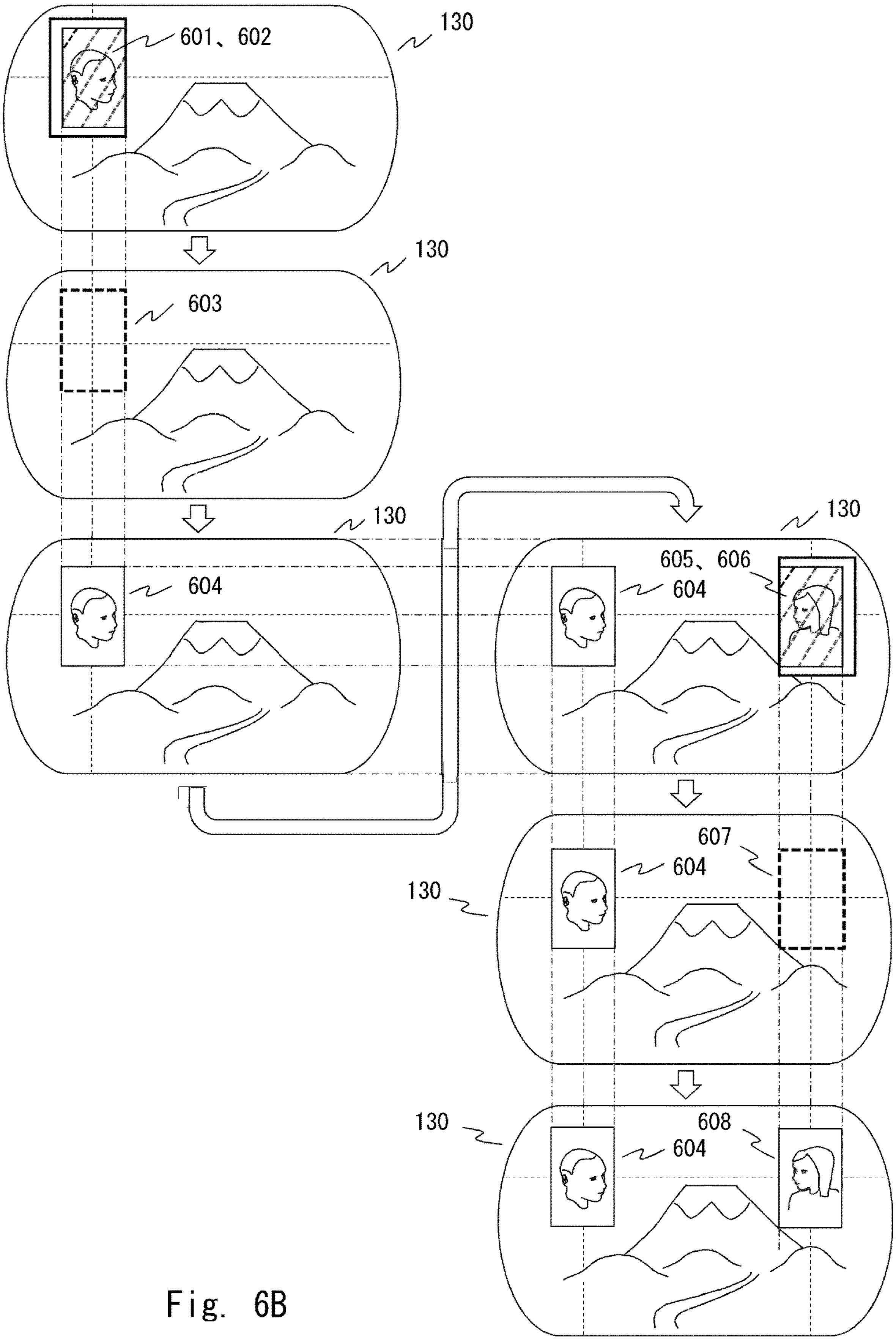
FIG. 6B is an example of a diagram schematically illustrating the appearance of the operation of the information processing device when the left and right folding screens of the foldable smartphone are displayed in the information processing system, the information processing device, and the image display device according to the present embodiment.

FIGS. 6A and 6B illustrate a case of a foldable smartphone 600 that can fold the display screen as a case where the application screens of a plurality of partial areas of the smartphone 100 are displayed on the HMD screen. Note that, in FIGS. 6A and 6B, portions illustrated in FIGS. 1A to 1D and FIGS. 2A to 2C and denoted by the same reference numerals have the same operation as the operation described in FIGS. 1A to 1D and FIGS. 2A to 2C, and thus detailed description thereof will be omitted.

When a left screen 601 of the left half of the foldable smartphone 600 enters the display screen of the HMD 200, as illustrated in FIG. 6A, the camera 121 of the HMD 200 photographs and captures the specific pattern 602 displayed on the left screen 601. In the HMD 200, the specific pattern 602 moving in the up, down, left, right, front, and rear directions 122 to 127 is photographed and read by the camera 121, and the position of the read specific pattern 602 is recognized as a display position displayed on the display screen of the HMD 200.

Next, in FIG. 6B, the size of the read specific pattern 602 is recognized as the display size of the left screen 601 displayed on the display screen of the HMD 200 (upper left part of FIG. 6B). Further, the HMD 200 generates an area frame 603 indicating the range of the read specific pattern 602 (left middle part in FIG. 6B). The user 10 moves the foldable smartphone 600 in the up, down, left, right, far and near directions while viewing the area frame 603 displayed on the HMD 200, and determines a suitable display position and display size at which the left screen 601 of the foldable smartphone 600 is displayed on the HMD. The HMD 200 transmits information of the display area defined by the determined display position and display size to the foldable smartphone 600, and the foldable smartphone 600 generates image data to be displayed in the acquired display area and transmits the image data to the HMD 200. The HMD 200 displays the image 604 of the left screen 601 in a predetermined display area based on the received image data.

Next, an example in which a right screen 605 of the right half of the foldable smartphone 600 is displayed at another position will be described. Here, similarly to the case of the left screen 601, the HMD 200 displays the area frame 607 indicating the range of the read specific pattern 606. The user 10 moves the foldable smartphone 600 in the up, down, left, right, far and near directions while viewing the area frame 607, and determines a suitable display position and display size at which the right screen 605 of the foldable smartphone 600 is displayed on the HMD 200. In the HMD 200, an image 608 of the right screen 605 of the foldable smartphone 600 is displayed in a display area determined by the determined display position and display size. With this operation, it is possible to display the left and right screen halves at different positions on the screen of the HMD 200 in a state where the foldable smartphone 600 is folded.

Note that, in FIGS. 6A and 6B, the case of two application screens of the foldable smartphone 600 has been exemplified, but it goes without saying that similar operations and effects can be obtained even in the case of displaying a plurality of application screens by screens of a plurality of smartphones 100.

Next, contrast harmonization processing between the application screen image displayed on the HMD screen and the screen of the HMD 200 will be described with reference to FIGS. 7A and 7B. When the contrast between the application screen image displayed on the HMD screen and the image on the display screen of the HMD 200 becomes unbalanced due to the reading of the specific pattern, problems such as difficulty in viewing the inserted application screen image (also referred to as an application insertion screen image), and difficulty in seeing the image on the HMD screen due to excessive emphasis of the application insertion screen image occur. Here, first, a transmissive HMD will be described as an example.

Figure 7A:
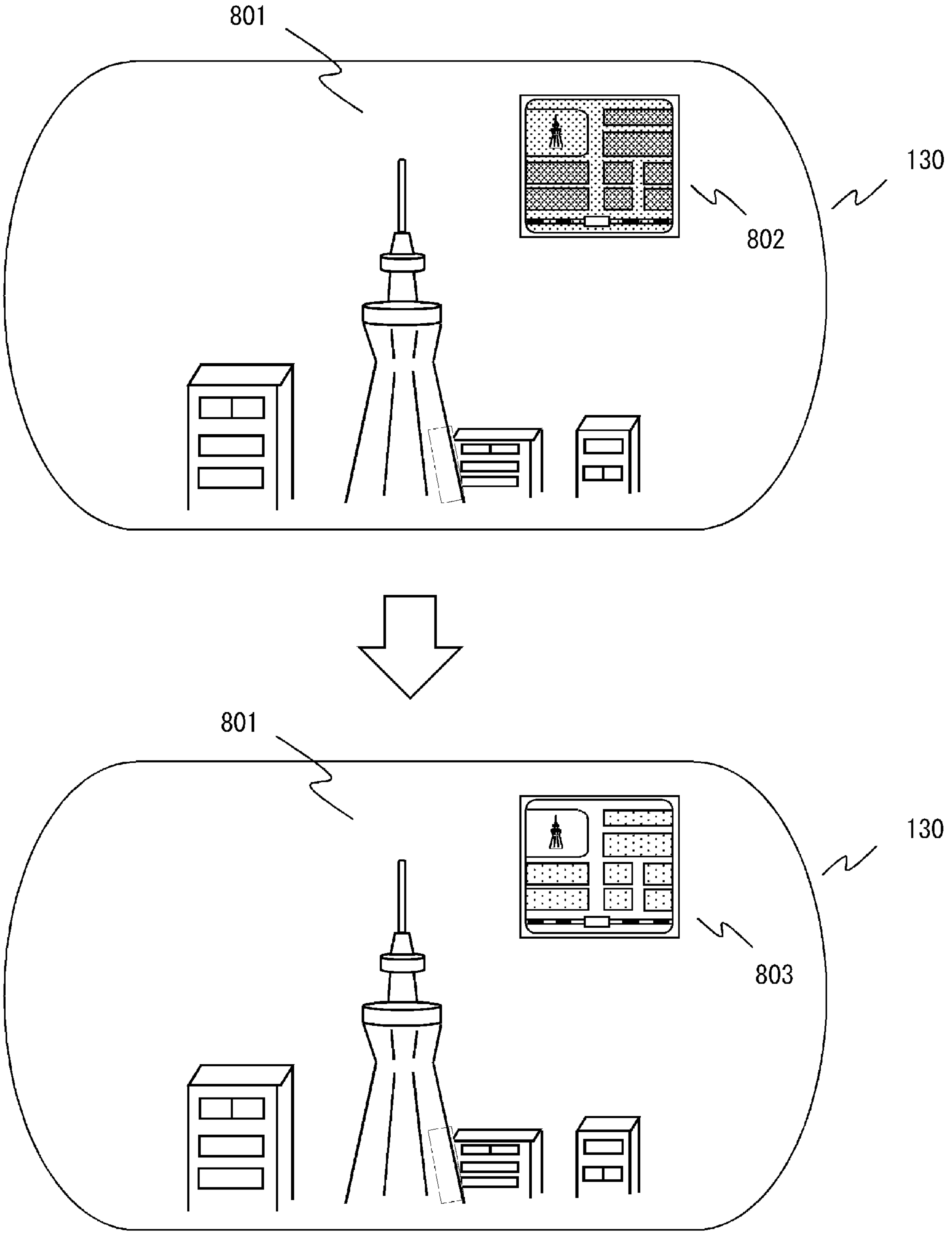
FIG. 7A is an example of a diagram for explaining contrast harmonization processing between a screen image of the information processing device and a screen image of the image display device in the information processing system, the information processing device, and the image display device according to the present embodiment.
Figure 7B:
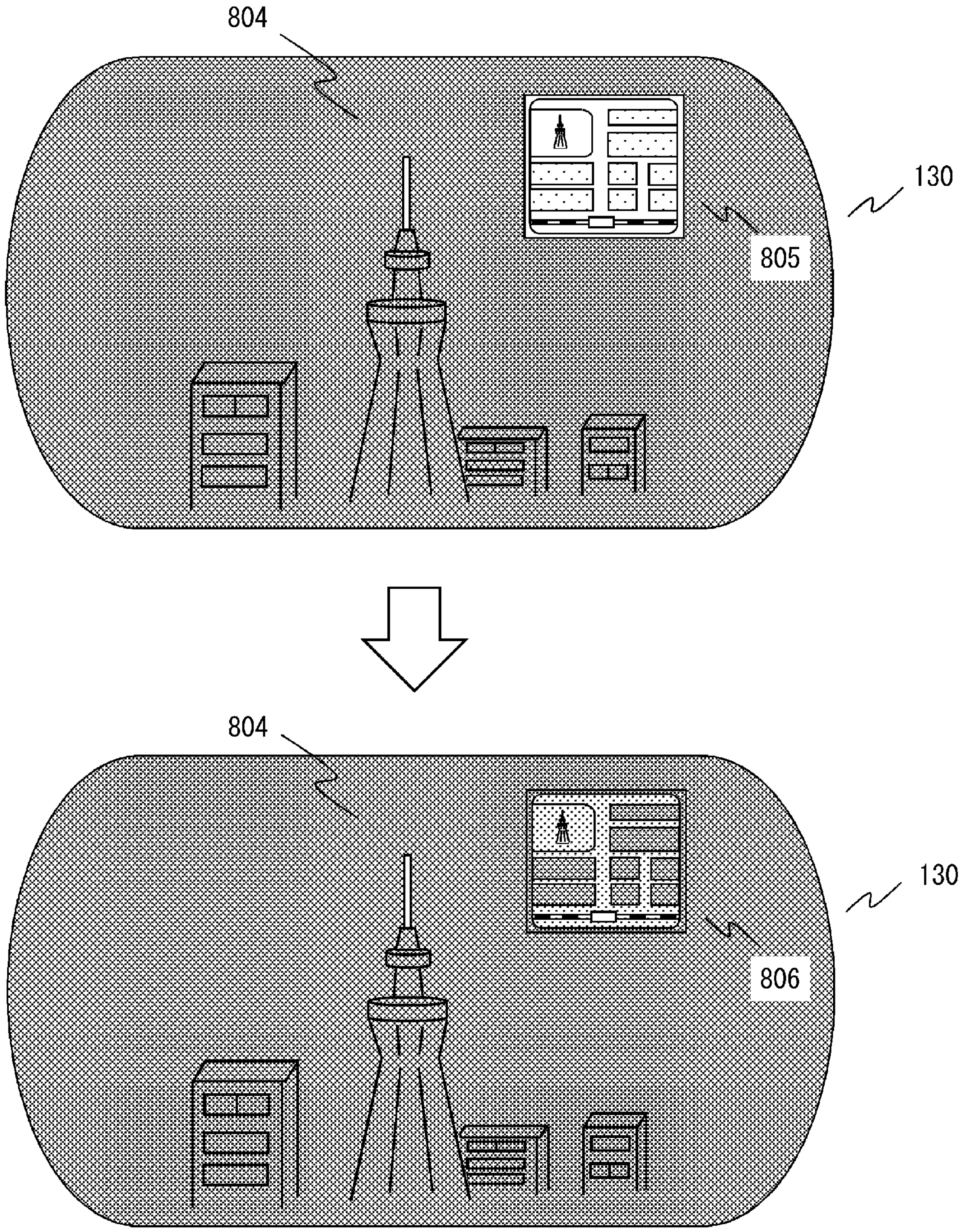
FIG. 7B is an example of a diagram for explaining the contrast harmonization processing between the screen image of the information processing device and the screen image of the image display device in the information processing system, the information processing device, and the image display device according to the present embodiment.

FIG. 7A is an example of a diagram for describing the contrast harmonization processing in a case where the surroundings are bright and the application screen image is difficult to see, such as outdoors, and FIG. 7B is an example of a diagram for describing the contrast harmonization processing in a case where the surroundings are dark and the contrast with the application screen image is too strong, such as at night.

As illustrated in FIG. 7A, there is a case where an image 802 of the application screen is relatively dark with respect to a landscape 801 around the HMD 200 that looks bright through the lens when the surroundings are bright such as outdoors. In such a case, the application screen image cannot be identified by the surrounding brightness. Meanwhile, the HMD 200 includes an illuminance sensor for detecting surrounding brightness and darkness, so that it is possible to detect brightness around a display position where an application screen image is displayed. Alternatively, in a case where the HMD 200 is equipped with the camera 121 that photographs the surroundings, it is possible to detect the luminance distribution from the image information photographed by the camera 121. The average luminance around the HMD or the brightness around the display position of the image 802 of the application screen is detected from the luminance information, and the detected surrounding brightness information is transmitted to the smartphone 100. In the smartphone 100, the luminance is increased as the image quality adjustment of the application insertion screen image according to the received ambient brightness information, and an image 803 of the application screen whose luminance has been increased is displayed on the HMD. As a result, the contrast between the application screen image and the periphery of the HMD becomes clear, and it is possible to eliminate or reduce the dark and unclear appearance of the application screen image.

In addition, as illustrated in FIG. 7B, when the surroundings are dark such as at night, an image 805 of the application screen appears relatively bright with respect to the surrounding scenery that appears dark through the lens, and the application screen image may be excessively emphasized. In this case as well, the illuminance sensor of the HMD 200 can detect the surrounding brightness (darkness) and adjust the display of the application screen image with appropriate luminance. Furthermore, in a case where the HMD 200 is equipped with the camera 121, the luminance distribution can be detected from the image information photographed by the camera 121. The average luminance around the HMD or the brightness around the position where the image 805 of the application screen is displayed is detected from the luminance information, and the detected ambient brightness information is transmitted to the smartphone 100. In the smartphone 100, the luminance is lowered as the image quality adjustment of the application insertion screen image according to the received ambient brightness information, and an image 806 of the application screen is displayed on the HMD 200. As a result, the contrast between the application insertion screen image and the HMD display screen image is harmonized, and excessive emphasis of the application insertion screen image can be eliminated or reduced, and eye fatigue caused by strong contrast can be reduced. In addition, the emphasis of the application insertion screen image may be suppressed by adjusting the color tone as the image quality adjustment of the application insertion screen image.

As described in FIGS. 7A and 7B, when the smartphone 100 and the HMD 200 do not cooperate with each other as described above, that is, in the case of the smartphone 100 alone, the smartphone 100 adjusts the luminance of the application screen image according to the surrounding environment. However, when the smartphone 100 and the HMD 200 cooperate with each other as described above, by adjusting the luminance of the application screen image according to the surrounding environment of the HMD 200, it is possible to secure definition and reduce eye fatigue. Note that, in addition to the method described with reference to FIGS. 7A and 7B, the brightness level of the application screen image displayed from the HMD 200 may be transmitted to the smartphone 100 and requested. In addition, when the application screen image is displayed on the HMD 200 side, the luminance and color tone of the application screen image may be adjusted and displayed.

Figure 8:
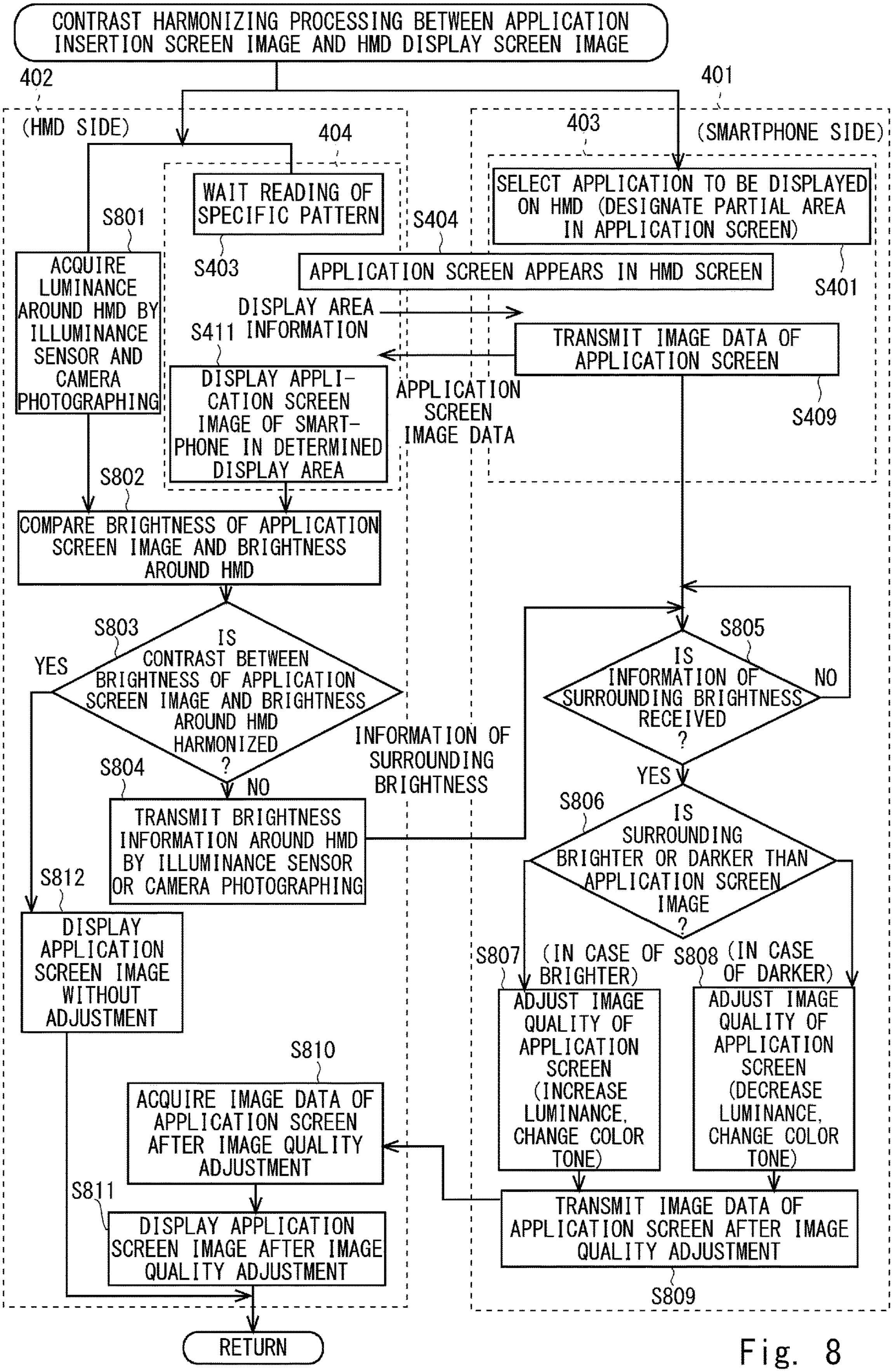
FIG. 8 is an example of a flowchart for explaining image adjustment processing at the time of contrast harmonization between the screen image of the information processing device and the screen image of the image display device in the information processing system, the information processing device, and the transmission type image display device according to the present embodiment.

FIG. 8 is an example of a flowchart for explaining the processing of harmonizing the contrast between the application display screen described with reference to FIGS. 7A and 7B and the scenery around the HMD 200. Note that, in FIG. 8, portions denoted with the same reference numerals as those in FIGS. 4 and 5 have the same operations as those already described in FIGS. 4 and 5, and thus detailed description thereof will be omitted. In FIG. 8, a portion surrounded by dotted lines 403 is the processing sequence from selection of an application on the smartphone 100 side to transmission of image data of the application screen of the smartphone 100, and a portion surrounded by dotted lines 404 is the processing sequence from reading of a specific pattern to display of an application screen image on the HMD 200 side, which is similar to the description of FIG. 4. The HMD 200 side displays the application screen image as indicated by a portion surrounded by dotted lines 404, detects brightness by the illuminance sensor, or photographs the surroundings with the camera 121 to acquire luminance from the surrounding image of the HMD 200 (S801). Next, the brightness of the application screen image and the brightness around the HMD 200 are compared (S802). In a case where either one is too bright or too dark (N in S803), the surrounding brightness is detected by the illuminance sensor of the HMD 200, or the surroundings are photographed by the camera 121 of the HMD 200 to analyze the luminance information, and information indicating the surrounding brightness of the HMD 200 is transmitted to the smartphone 100 (S804). Upon receiving the information of the surrounding brightness (S805), in a case where the surrounding is brighter than a predetermined threshold with respect to the application screen image according to the received information of the surrounding brightness (S806), the smartphone 100 side increases the luminance as image quality adjustment of the application screen to be displayed (S807). Meanwhile, in a case where the surroundings are darker than the predetermined threshold with respect to the application screen image (S806), the color tone is adjusted so as to lower the luminance or reduce the emphasis as the image quality adjustment of the application screen to be displayed (S808). Further, the image data of the application screen after the image quality adjustment is transmitted to the HMD 200 (S809). The HMD 200 acquires the image data of the application screen after the image quality adjustment (S810), and displays the application screen image after the image quality adjustment on the HMD 200 (S811). When the brightness around the HMD 200 is compared with the brightness of the application screen image and the application screen image is clearly viewed or is not extremely bright (Y in S803), the application screen image is displayed without adjustment in the HMD display screen (S812).

According to the above sequence, the image of the application screen can be displayed with appropriate brightness with respect to the brightness around the HMD 200, and the user 10 can visually recognize the image of the application screen in the HMD 200 without feeling difficulty or fatigue in a contrast manner.

Here, in FIG. 8, the case where the HMD 200 is a transmissive HMD has been described. Next, in the shielded HMD, a case of a video see-through type in which an entity or a virtual object in a real space is photographed by the camera 121 provided on the front of the head and is displayed on the display in front of the eyes will be described. First, the specific pattern of the smartphone 100 in the front field of view is recognized, and the application screen image is inserted and displayed at a suitable display position and display size in the display screen of the HMD 200. Then, in a case of switching the display from the surrounding screen display by the camera 121 of the HMD 200 to the video content supplied in the HMD 200 or via an external device or a network, an application screen image may be combined with a part of the video content and displayed on the display in front of the eyes. In this case, when the contrast between the image of the video content information and the application screen image becomes unbalanced depending on the atmosphere of the video content or the use of the application screen image to be inserted, there occur problems such as difficulty in viewing the application screen image of interest, or the application screen image is excessively emphasized, and the atmosphere of the image of the video content is lost. Meanwhile, the content of the video content, for example, the brightness and the type (whether the user does not want to be disturbed like a movie or a music video, or the like) of the video content are detected. In addition, the HMD 200 also analyzes the importance of the display content of the application screen image according to the type of the application or the like, and adjusts the image quality (luminance, color tone as needed) of the application screen image to be inserted. For example, when it is desired to focus on the application screen image at all times, the image quality (luminance, color tone as needed) of the application screen image is adjusted so that the application screen image stands out, and the application screen image is inserted into and displayed on the HMD display screen. Alternatively, when it is desired to concentrate on the video content, the image quality (luminance, color tone as needed) of the application screen image is adjusted so that the application screen image is not noticeable, and the application screen image is inserted into and displayed on the HMD display screen.

By adjusting the image quality of the application screen image to be inserted in accordance with the image content of the video content information in this manner, it is possible to achieve a contrast balance between the video content information image and the application screen image in a form corresponding to the attention importance level for the video content information image or the application screen image. As a specific example, in a case where the application screen image is information that needs attention such as emergency information, the application screen image is displayed so as to be conspicuous, and in a case where the application screen image is merely additional information such as time and weather forecast, the application screen image is displayed so as not to be conspicuous.

Note that the image quality adjustment of the application screen image displayed on the HMD 200 may be requested to the smartphone 100 side, or the image quality of the application screen image may be adjusted and displayed when the application screen image is displayed on the HMD 200 side.

Figure 9:
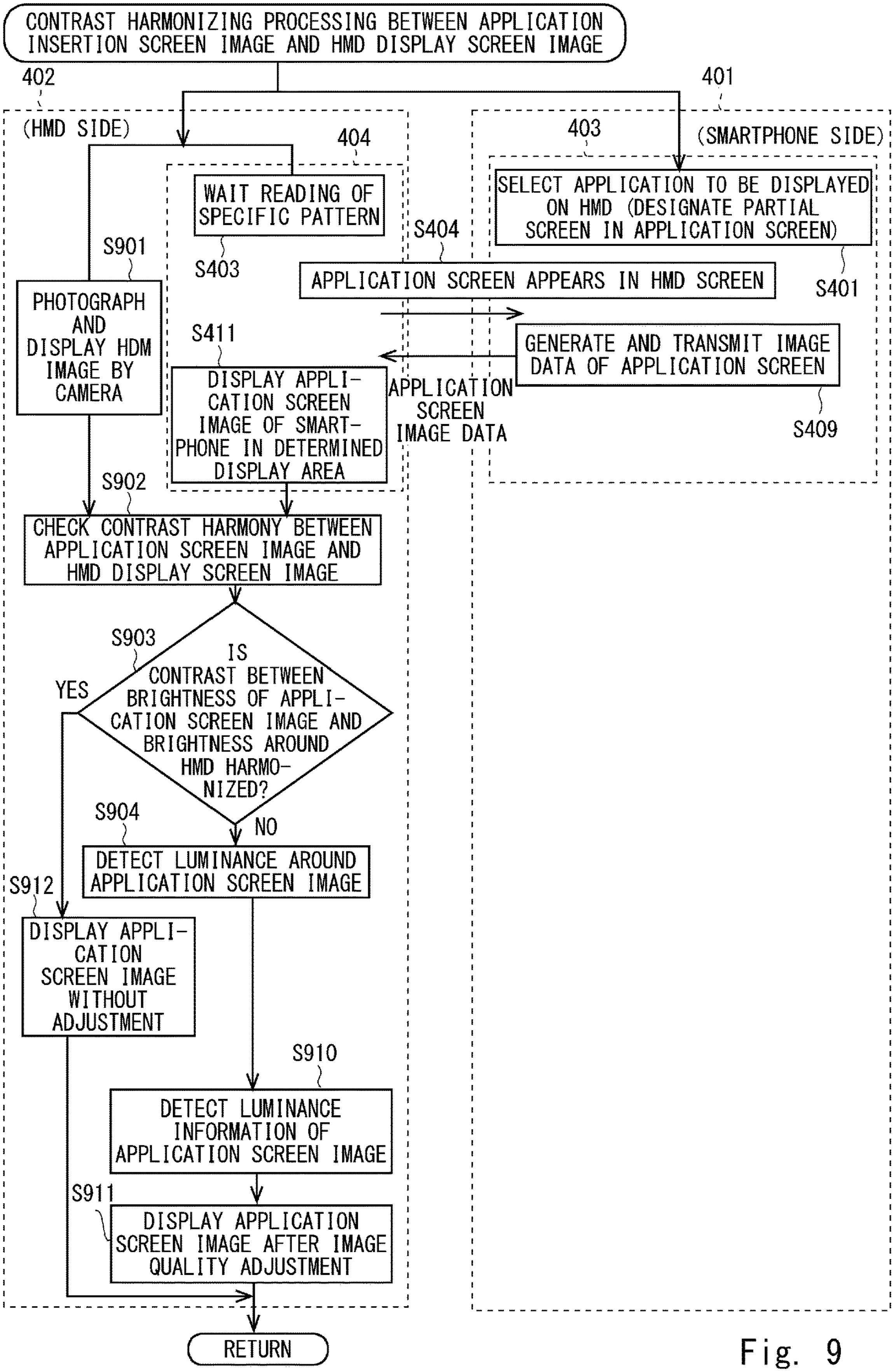
FIG. 9 is an example of a flowchart for explaining the image adjustment processing at the time of the contrast harmonization between the screen image of the information processing device and the screen image of the image display device in the information processing system, the information processing device, and the shielded image display device according to the present embodiment.

FIG. 9 is an example of a flowchart for explaining the contrast harmonizing processing between the application screen image and the HMD display screen image described above. Note that, in FIG. 9, the same reference numerals as those in FIGS. 4 and 5 have the same operations as those already described in FIGS. 4 and 5, and thus detailed description thereof will be omitted. In FIG. 9, a portion surrounded by dotted lines 403 is a processing sequence from the selection of the application on the smartphone 100 side to transmission of image data of the application screen of the smartphone 100, and a portion surrounded by dotted lines 404 is a processing sequence from reading of a specific pattern to display of an application screen image on the HMD 200 side, which is similar to the description of FIG. 4. In the video see-through mode of the shielded HMD, the periphery is photographed and displayed by the camera 121 mounted on the HMD 200 (S901). At the same time, as indicated by a portion surrounded by dotted lines 404, the application screen image is combined with a camera-photographed image and displayed. In this state, by checking whether the contrast is harmonized (S902), it is checked whether the application screen image is inserted into the HMD display screen without uncomfortable feeling or discomfort. In a case where the contrasts of the application screen image and the HMD display screen image are not harmonized (N in S903), the luminance distribution around the application screen image of the content to be displayed on the HMD is analyzed to obtain luminance information (S904). Next, the luminance distribution of the application screen image is analyzed to obtain luminance information (S910). Then, in a case where the surroundings are bright with respect to the application screen image according to luminance information around the application screen image on the HMD 200 side, the luminance is increased as image quality adjustment of the application screen image to be inserted. In addition, in a case where the surroundings are dark with respect to the application screen image, the color tone is adjusted to lower the luminance or reduce the emphasis as image quality adjustment of the application screen image to be inserted. Then, the application screen image after the image quality adjustment is inserted into the HMD display screen and displayed (S911). In a case where the contrast between the two images is harmonized (Y in S903), the application screen image is inserted into the HMD display screen and displayed without adjustment (S912). According to the above sequence, it is possible to realize the balance of the contrast between the application screen image and the HMD display screen image, and it is possible to reduce the visual discomfort and the fatigue feeling for the user 10 by the strength of the contrast. Furthermore, in a case where the user switches the mode of the HMD to display content such as a movie or a music video on the HMD after reading the application screen in the video see-through mode of the HMD, the processing after S902 is adjusted so that the contrast with the content is harmonized.

Figure 10:
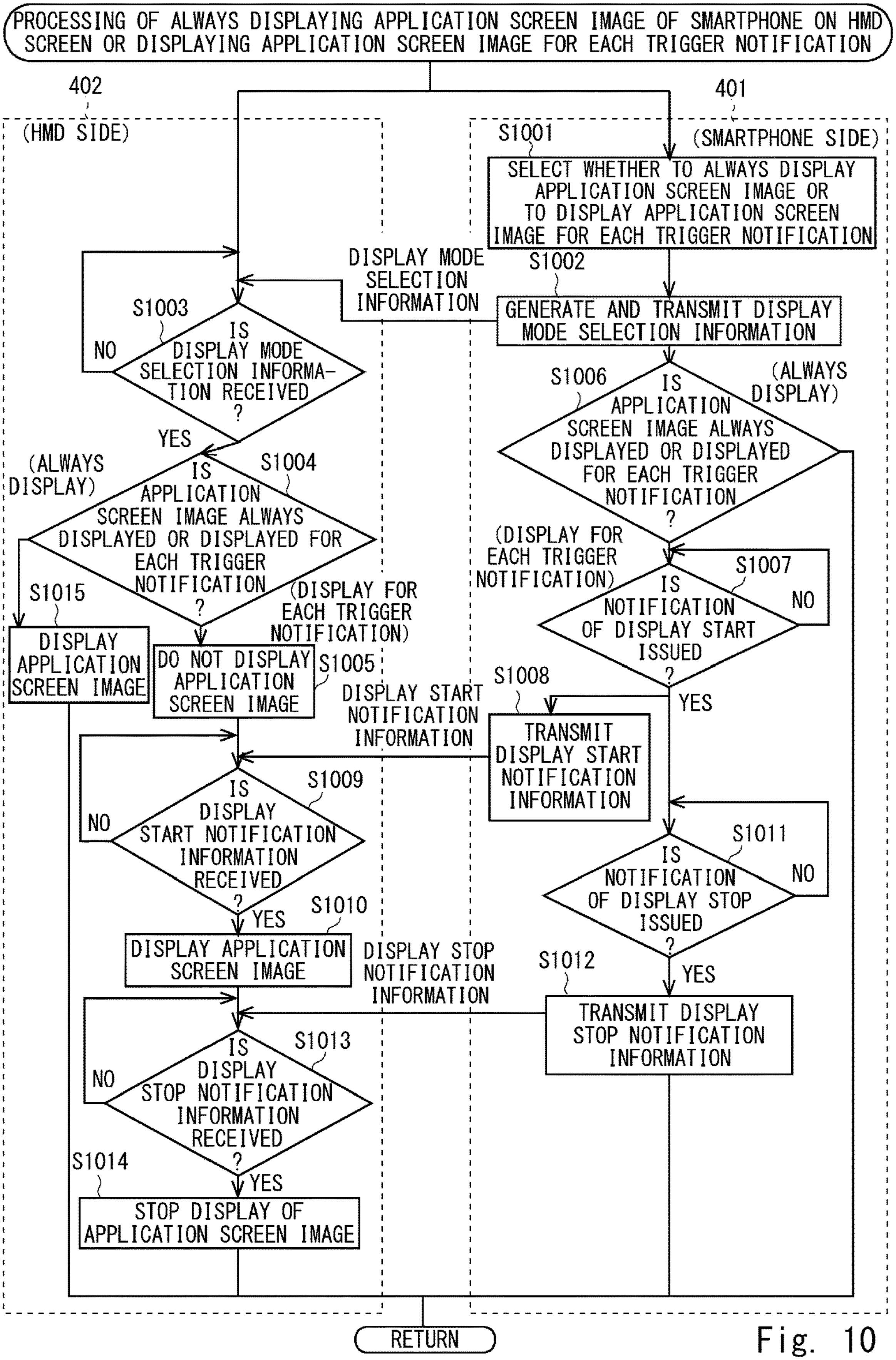
FIG. 10 is an example of a flowchart for explaining processing in a case where always display or display for each trigger notification is performed in the information processing system, the information processing device, and the image display device according to the present embodiment.

Next, processing of always displaying the application screen image of the smartphone 100 inserted into and displayed on the HMD screen on the HMD display screen or displaying the application screen image for each trigger notification will be described with reference to FIG. 10. FIG. 10 is an example of a flowchart illustrating processing in a case where always display or display for each trigger notification is performed in the information processing system, the information processing device, and the image display device according to the present embodiment. Note that, in FIG. 10, the same reference numerals as those in FIGS. 4 and 5 have the same operations as those already described in FIGS. 4 and 5, and thus detailed description thereof will be omitted. In FIG. 10, the user 10 selects whether to always display the application screen image or to display the application screen image for each trigger notification on the smartphone 100 (S1001). Display mode selection information indicating the selected display mode is transmitted to the HMD 200 (S1002). In the HMD 200, the display mode selection information is received (S1003), and in a case where the application screen image to be inserted and displayed is the display for each trigger notification (under S1004), the application screen image on the HMD screen is not displayed (S1005), and a state of waiting for the display start notification for each trigger notification from the smartphone 100 to come is brought. Furthermore, in a case where the application screen image is displayed for each trigger notification on the smartphone 100 side (S1006), when the display start notification for each trigger notification is issued (S1007), the display start notification information indicating the start of display for each trigger notification is transmitted to the smartphone 100 (S1008). The HMD 200 receives the display start notification information (S1009), and starts displaying the application screen image (S1010). Thereafter, when the notification of stop of display for each trigger notification is issued by the smartphone 100 (S1011), display stop notification information indicating stop of display for each trigger notification is transmitted to the smartphone 100 (S1012). The HMD 200 receives the display stop notification information (S1013), and stops displaying the application screen image (S1014). Meanwhile, when the display mode selection information is received and the application screen image to be inserted and displayed is always displayed (left in S1004), the HMD 200 always displays the application screen image in the HMD screen (S1015). Note that the display of the application screen on the smartphone 100 may be not displayed as necessary.

In addition, when the application screen image is deleted after the application screen image is displayed for a while, an operation of returning the application of the application screen image to the application screen is performed again, and the application screen image may be divided and displayed. For example, the application screen displayed on the HMD 200 is returned to the screen display of the main body of the smartphone 100 by the operation of performing the operation of overlapping the actual smartphone 100 with the background so as to overlap the application screen image displayed on the HMD 200, as in the operation of introducing the application screen described with reference to FIGS. 1 and 2. When such an operation is specified, the user 10 can display the application screen on the HMD 200 or return the application screen to the smartphone 100 by the same operation, so that the operation is easy to understand.

According to the above sequence, at the time of display for each trigger notification, the application screen image can be displayed on the HMD display screen only when necessary by the trigger of the smartphone 100, and it is possible to prevent the application screen image from being disturbed when unnecessary. For example, in the case of a phone application, an application screen image is displayed on the HMD screen when there is an incoming call, and the HMD display of the application screen image is stopped when the call is ended. In addition, by setting and grasping whether to always display or display for each trigger notification on the smartphone 100 side, it is sufficient to transmit the image data of the application insertion screen only when necessary in the case of display for each trigger notification, and there is an advantage that battery consumption can be saved. Note that, in a case where a plurality of applications of the smartphone 100 is inserted into and displayed on the HMD 200, each piece of display mode selection information may be transmitted to the HMD 200. Further, the HMD side may select whether to always display the image of the application screen or to display the image for each trigger notification.

Figure 11A:
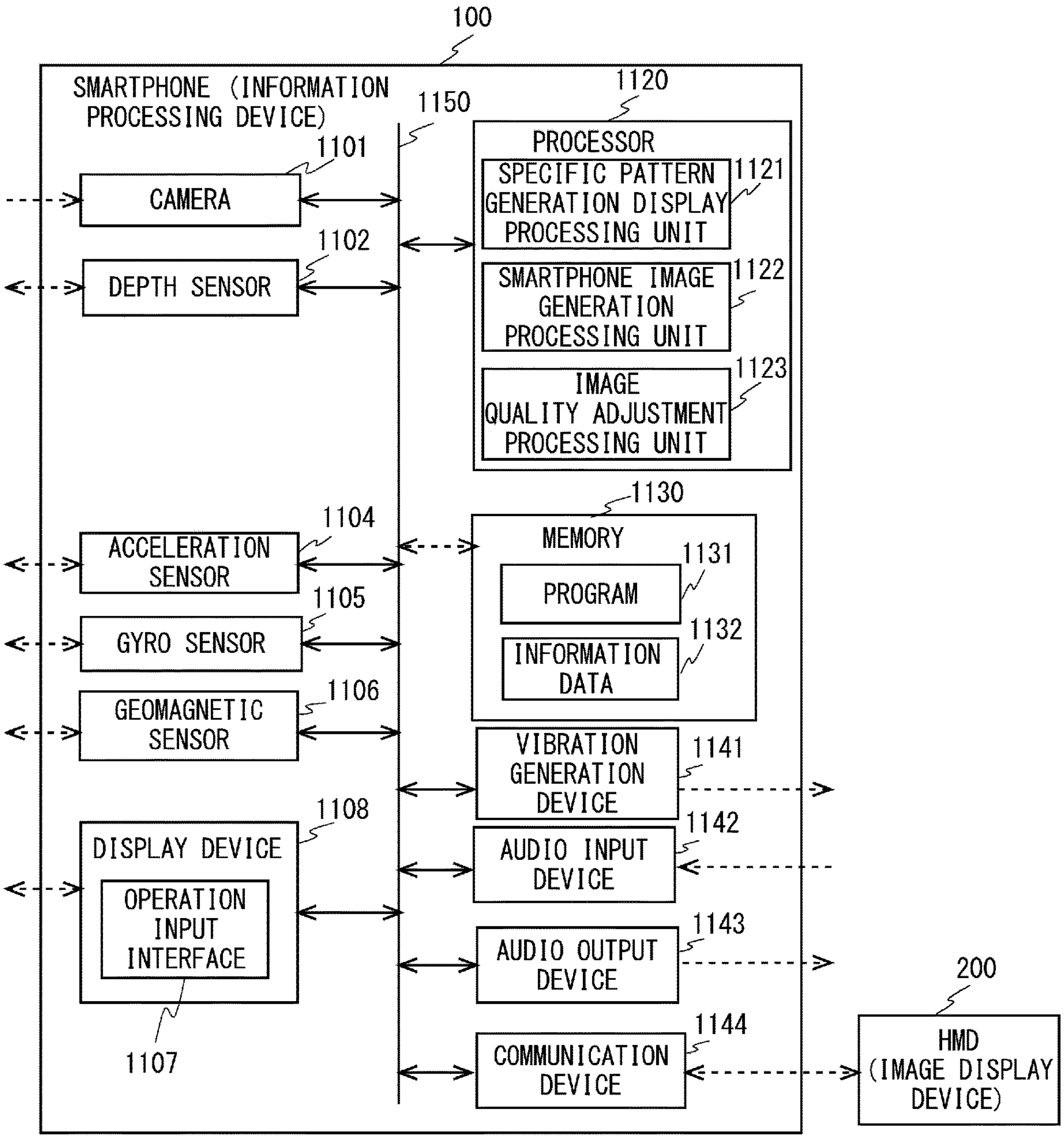
FIG. 11A is a block diagram illustrating a configuration example of the information processing system, the information processing device, and the image display device according to the present embodiment.
Figure 11B:
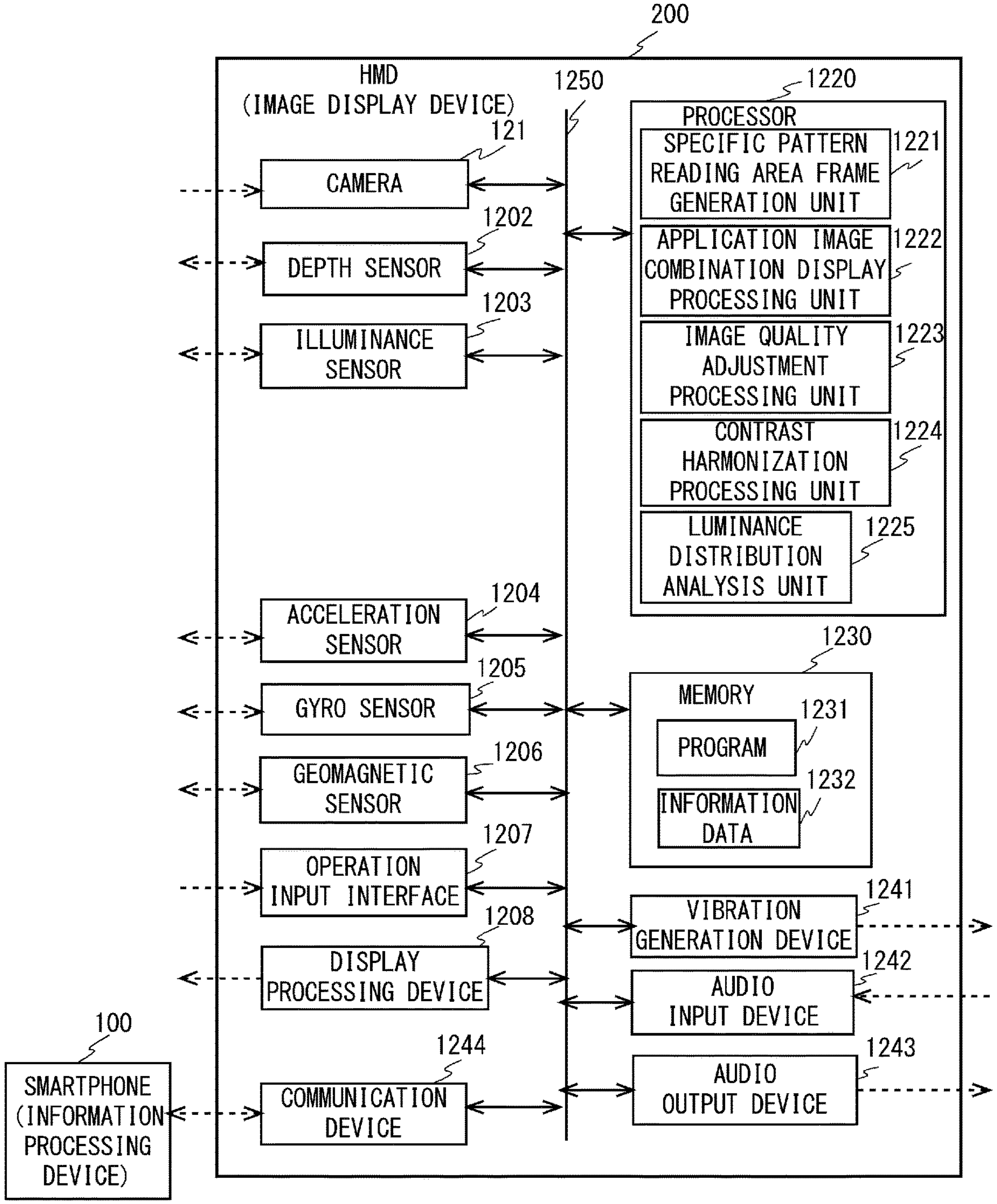
FIG. 11B is a block diagram illustrating a configuration example of the information processing system, the information processing device, and the image display device according to the present embodiment.

FIG. 11A illustrates an example of a block diagram of a portable smartphone 100 as a specific example of the information processing device. FIG. 11B illustrates an example of a functional block diagram of the HMD 200 as a specific example of the image display device. In FIGS. 11A and 11B, portions illustrated in FIGS. 1A to 1D and denoted by the same reference numerals have the same operation as the operation already described in FIGS. 1A to 1D, and thus detailed description thereof will be partially omitted. In FIG. 11A, the smartphone 100 is configured by appropriately using a camera 1101, a depth sensor 1102, an acceleration sensor 1104, a gyro sensor 1105, a geomagnetic sensor 1106, an operation input interface 1107, a display device 1108, a processor 1120, a memory 1130 including a program 1131 and information data 1132, a vibration generation device 1141, an audio input device 1142, an audio output device 1143, and a communication device 1144, and each component is connected to each other via a bus 1150.

The camera 1101 converts light incident from the lens into an electric signal by the imaging element to acquire a camera-photographed image.

The depth sensor 1102 is a sensor capable of measuring a distance and an angle to an object and capturing a shape of the object such as a material as a solid. A measurement method is not limited, and examples thereof include a time-of-flight (TOF) sensor that irradiates an object with laser light such as infrared light, measures reflected scattered light, and analyzes and detects a distance to an object at a long distance and a state of the object, a light detection and ranging (LiDAR) that measures a reflection time of pulsed light emitted to a subject for each pixel and measures a distance, and a millimeter wave radar that emits a millimeter wave, captures the reflected wave, and detects a distance to an object being reflected and the state of the object.

The acceleration sensor 1104 is a sensor that detects acceleration, which is a change in speed per unit time, and can capture motion, vibration, impact, and the like. The inclination and direction of the smartphone 100 can be detected by the acceleration sensor 1104 provided in the smartphone 100. In addition, the gyro sensor 1105 is a sensor that detects an angular velocity in the rotation direction, and can capture states of vertical, horizontal, and oblique postures. Therefore, the posture such as the inclination and direction of the smartphone 100 can be detected using the acceleration sensor 1104 and the gyro sensor 1105. The geomagnetic sensor 1106 is a sensor that detects the magnetic force of the earth, and detects the direction in which the smartphone 100 is facing. It is also possible to detect the movement of the smartphone 100 by capturing the geomagnetic change with respect to the movement of the smartphone 100 using a three-axis type that also detects the geomagnetism in the up-down direction in addition to the front-rear direction and the left-right direction. As a result, it is possible to detect and discriminate the posture state of the user 10 carrying the smartphone 100.

The processor 1120 is configured by a CPU or the like, and executes the program 1131 such as an operating system (OS) or an operation control application stored in the memory 1130, thereby controlling each component of the smartphone 100 and realizing functions such as the OS, middleware, and an application and other functions. In the smartphone 100, a specific pattern generation display processing unit 1121, a smartphone image generation processing unit 1122, and an image quality adjustment processing unit 1123 control each functional operation. Furthermore, the processor 1120 of the smartphone 100 may control the operation of the HMD 200 via wireless communication. For example, the HMD 200 may be controlled such that the application screen image supplied to the HMD 200 is displayed on the HMD 200. Specifically, the processor 1120 may cause the image display device to recognize the display position and the display size of the screen of the information processing device photographed and read by the camera 121 as a display area by the user 10 holding the screen over the camera 121. Furthermore, the processor 1120 may control the image display device to display the image of the screen of the supplied information processing device in the recognized display area. For example, the processor 1120 may control the image display device to display the supplied application screen image in the recognized display area.

The memory 1130 includes a non-volatile storage device or the like, and stores various programs 1131 and information data 1132 handled by the processor 1120 or the like. As the information data 1132, display area information, image data of an application screen of the smartphone 100, image display stop information of an application screen of the smartphone 100, information of surrounding brightness, display mode selection information, and the like are stored.

The display device 1108 of the smartphone 100 displays display contents via a highly transparent touch panel constituted by a liquid crystal or the like, and displays an application screen being operated, icons of a start application and various state displays, various operation buttons, notifications to the user, and the like. Examples of the notification to the user include that information of the display area has been acquired and that image quality adjustment has been completed.

The operation input interface 1107 of the smartphone 100 inputs input information to the smartphone 100 by the user 10. In a case of the smartphone 100 or the like, a touch operation by a finger, a touch pen, or the like is detected as an operation input by a touch panel configured on a display surface of the display device 1108, and the user 10 can set and input information desired to be input. Furthermore, for example, the input operation information may be introduced by a keyboard, a key button, or the like, or the user 10 may utter a voice indicating an input operation and collect the voice by the audio input device 1142 to introduce the input operation information. For example, the user 10 selects a screen of the information processing device to be displayed on the image display device according to the user input by the operation input interface 1107. In addition, the user 10 selects an application screen or a partial area of the application screen displayed on the image display device by the user input through the operation input interface 1107.

The audio input device 1142 collects a voice from the outside or the user's own vocalization with a microphone and converts the voice into voice data. It is possible to introduce the instruction information by the utterance sound from the user into the smartphone 100 and to execute the operation with respect to the instruction information with good usability.

The audio output device 1143 is a device that outputs audio from a speaker or a headphone on the basis of the audio data, and can notify the user of the notification by audio.

The vibration generation device 1141 generates vibration under the control of the processor 1120, and converts a notification to the user 10 transmitted by the smartphone 100 into vibration. The vibration generation device 1141 can transmit the vibration to the handle holding the smartphone 100 to notify the user 10 of the notification. Note that examples of the notification to the user include a notification indicating generation or reading of a specific pattern, display of an application screen image, and the like, and notification contents, and the usability can be improved by the notification information.

The communication device 1144 is a communication interface for performing wireless communication at least between the smartphone 100 and the HMD 200 by short-distance wireless communication, wireless LAN, or base station communication and connecting to a network, and includes a communication processing circuit, an antenna, and the like corresponding to various communication interfaces, and transmits and receives image data photographed by the camera, a control signal, and the like. Note that near field communication is performed using a wireless LAN such as Bluetooth (registered trademark), IrDA (Infrared Data Association, registered trademark), Zigbee (registered trademark), Home RF (Home Radio Frequency, Registered Trademark), or Wi-Fi (registered trademark). Further, as the base station communication, long distance radio communication such as W-CDMA (Wideband Code Division Multiple Access, registered trademark) or GSM (Global System for Mobile Communications) may be used. For example, the communication device 1144 supplies an image of a screen of the information processing device displayed on the image display device to the image display device. In addition, the communication device 1144 supplies an application screen image which is an application screen displayed on the image display device or an image of a partial area to the image display device.

The specific pattern generation display processing unit 1121 of the smartphone 100 generates and displays a pattern to be read by the HMD 200 in the entire screen or a partial area of the application screen of the smartphone 100 selected by the user 10. For example, the specific pattern generation display processing unit 1121 generates and displays a specific pattern having a range of the selected application screen or a partial area of the application screen. In addition, the specific pattern generation display processing unit 1121 may make the specific pattern to be generated and displayed translucent.

The smartphone image generation processing unit 1122 of the smartphone 100 generates image data of an application screen such as an application to be displayed in the display area of the HMD screen on the basis of the display area information from the HMD 200.

In a case where it is difficult to see the smartphone display screen or in a case where the contrast between the application screen image and the HMD screen image is not balanced, the image quality adjustment processing unit 1123 adjusts the image quality (luminance, color tone) of the application screen image so that the two images are balanced. For example, when disharmony of the contrast s identified by the harmony degree of the identified contrast, the image quality adjustment processing unit 1123 adjusts the image quality of the application screen image such that the contrast is harmonized. Specifically, the image quality adjustment processing unit 1123 adjusts the luminance of the application screen image according to the output from the illuminance sensor.

Next, in FIG. 11B, the HMD 200 is configured by appropriately using the camera 121, a depth sensor 1202, an illuminance sensor 1203, an acceleration sensor 1204, a gyro sensor 1205, a geomagnetic sensor 1206, an operation input interface 1207, a display processing device 1208, a processor 1220, a memory 1230 including a program 1231 and information data 1232, a vibration generation device 1241, an audio input device 1242, an audio output device 1243, and a communication device 1244, and each component is connected to each other via a bus 1250.

The camera 121 photographs an image of a field of view in front of the HMD 200, and converts light incident from the lens into an electric signal by an imaging element to acquire a camera-photographed image. The camera 121 mounted on the HMD 200 photographs a field of view seen from the user 10 wearing the HMD 200, and can capture specific patterns 104, 202, and 302 on the display screen 101 of the smartphone 100 held in the field of view. For example, the user 10 can photograph an image by the camera 121 by holding the screen of the information processing device over the camera 121.

The depth sensor 1202 is a sensor that can measure a distance and an angle to an object similar to those of the smartphone 100 and can capture a shape of the object such as a material as a solid. In a case where the smartphone 100 is in front of the user 10, the depth sensor 1202 included in the HMD 200 can measure the distance to the smartphone 100 when the smartphone 100 is captured and found by the camera 121.

The acceleration sensor 1204 is a sensor that detects acceleration, which is a change in speed per unit time, and can capture motion, vibration, impact, and the like. The acceleration sensor 1204 included in the HMD 200 can detect the inclination of the HMD 200 worn on the head of the user 10 and the direction of the front of the face. In addition, the gyro sensor 1205 is a sensor that detects an angular velocity in the rotation direction, and can capture states of vertical, horizontal, and oblique postures. The attitude such as the inclination and direction of the HMD 200 can be detected using the acceleration sensor 1204 and the gyro sensor 1205. The geomagnetic sensor 1206 is a sensor that detects the magnetic force of the earth, and detects the orientation in which the HMD 200 is facing. It is also possible to detect the movement of the HMD 200 by capturing the geomagnetic change with respect to the movement of the HMD 200 using a three-axis type that also detects the geomagnetism in the up-down direction in addition to the front-rear direction and the left-right direction. As a result, it is possible to detect and discriminate the posture state of the user 10 wearing the HMD 200.

The processor 1220 is configured by a CPU or the like, and executes the program 1231 such as an operating system (OS) or an operation control application stored in the memory 1230 to control each component of the HMD 200 and implement functions such as the OS, middleware, and applications and other functions. The memory 1230 includes a non-volatile storage device or the like, and stores various programs 1231 and information data 1232 handled by the processor 1220 or the like. As the information data 1232, image data of an application screen of camera photographing, display area information, image data of an application screen whose image quality has been adjusted by the smartphone, image display stop information of an application or the like of the smartphone, ambient brightness information, display mode selection information, and the like are stored.

In the case of the optical see-through type HMD 200, the display processing device 1208 of the HMD 200 projects characters, symbols, video content, virtual objects, and the like by a small projector. Furthermore, as described in the present embodiment, a camera-photographed image transmitted from the smartphone 100, notification information to the user 10, and the like are projected. The projected virtual object or the like includes a transparent half mirror that forms and displays an image in front of the eyes. As a result, the user 10 can visually recognize the virtual object and the entity in the field of view in front of the user's eyes in a state in which the formed virtual object is floating. Furthermore, in the case of a video see-through type, the display is configured by a display such as a liquid crystal panel that combines and displays a video in front of the eyes photographed by the camera 121, a virtual object, and the like. As a result, the user 10 can visually recognize the entity in the field of view image in front of the eyes and the virtual object in an overlapping manner.

The operation input interface 1207 of the HMD 200 often uses gesture operation or voice input. An operation input interface such as a button or a touch panel is attached to the HMD in a small number of places, but may be provided at a position or in a form in which the user 10 can easily perform an input operation, or may be in a form in which a mouse or a keyboard is connected in a wired or wireless manner separately from the main body of the HMD 200. In addition, a virtual input operation screen may be displayed in the display screen of the display processing device 1208, and the input operation information may be introduced according to a position on the input operation screen to which the line of sight is directed, or a pointer may be displayed on the input operation screen, and the pointer may be operated by the operation input interface 1207 to introduce the input operation information. Furthermore, the user 10 may utter a voice indicating an input operation, collect the voice by the audio input device 1242, and introduce the input operation information.

The audio input device 1242 collects a voice from the outside or the user's own vocalization with a microphone and converts the voice into voice data. It is possible to introduce the instruction information by the utterance sound from the user 10 into the HMD 200 and execute the operation with respect to the instruction information with good usability. The audio output device 1243 outputs audio from a speaker or a headphone on the basis of the audio data, so that notification information to the user can be known by audio.

The vibration generation device 1241 generates vibration under the control of the processor 1220, and converts notification instruction information to the user 10 transmitted by the HMD 200 into vibration. The vibration generation device 1241 can transmit vibration to the head of the user wearing the HMD 200 to notify the user 10 of the notification instruction information. Note that examples of the notification information to the user 10 include a notification indicating an incoming call, a warning of danger information, reading of a specific pattern of the present embodiment, display of an application screen image, and the like, and the usability can be improved by these notifications.

The communication device 1244 is a communication interface that performs wireless communication between the smartphone 100 and the HMD 200 or connects to a network by short-distance wireless communication, wireless LAN, or base station communication. A communication processing circuit, an antenna, and the like corresponding to a predetermined communication interface are included, and transmission and reception of image data photographed by a camera, a control signal, and the like are performed. Note that near field communication is performed using a wireless LAN such as Bluetooth (registered trademark), IrDA (Infrared Data Association, registered trademark), Zigbee (registered trademark), Home RF (Home Radio Frequency, Registered Trademark), or Wi-Fi (registered trademark). Further, as the base station communication, long distance radio communication such as W-CDMA (Wideband Code Division Multiple Access, registered trademark) or GSM (Global System for Mobile Communications) may be used.

A specific pattern reading area frame generation unit 1221 of the HMD 200 reads the specific pattern displayed on the screen of the smartphone 100 and generates an area frame of the specific pattern on the screen of the HMD 200. For example, the specific pattern reading area frame generation unit 1221 photographs and reads the selected screen of the information processing device by the camera 121 when the user 10 holds the screen over the camera 121. Then, the specific pattern reading area frame generation unit 1221 recognizes the display position and display size of the read screen of the information processing device as a display area. In addition, the specific pattern reading area frame generation unit 1221 may photograph and read the selected application screen or the selected partial area of the application screen with the camera 121 by the user 10 holding the screen at a suitable position, and recognize the display position and the display size of the read application screen or partial area as the display area. Furthermore, the specific pattern reading area frame generation unit 1221 may generate an area frame indicating the range of the specific pattern generated and displayed by the information processing device, and display the area frame on the display screen of the image display device.

An application image combination display processing unit 1222 of the HMD 200 acquires the image data of the application screen from the smartphone 100, and performs processing of inserting the acquired image data of the application screen into the HMD screen image and combining the image data. For example, the application image combination display processing unit 1222 displays the image of the selected screen of the information processing device in the recognized display area. In addition, the application image combination display processing unit 1222 may display the application screen image of the application screen or the partial area selected by the information processing device in the recognized display area.

A contrast harmonization processing unit 1224 of the HMD 200 performs processing of identifying whether or not the contrast between the application screen image and the HMD screen image is harmonized.

In a case where the contrast between the application screen image and the HMD screen image is not harmonized, the image quality adjustment processing unit 1223 adjusts the image quality (luminance, color tone) of the application screen image so that both images are harmonized with each other. In the case of the transmissive HMD, the luminance of the application screen image is adjusted, if necessary, the color tone is adjusted in accordance with the brightness around the HMD 200 detected by the illuminance sensor 1203. In a case where the HMD screen is a video content, the luminance and color tone of the application screen image are adjusted according to the image content (brightness, type) of the video content.

A luminance distribution analysis unit 1225 analyzes the average value of the luminance in the screen and the intensity of the partial luminance by creating a histogram indicating the intensity of the luminance for each pixel or each block with respect to the video displayed on the shielded HMD. The contrast is adjusted based on the analysis result.

With the above configuration, in the smartphone 100, the specific pattern is displayed on the selected application screen displayed on the HMD screen by the specific pattern generation display processing unit 1121, and in the HMD, the specific pattern reading area frame generation unit 1221 reads the specific pattern and displays the area frame indicating the range of the specific pattern on the HMD screen. The display position and the display size are determined by moving the smartphone 100 up, down, left, right, front, and back by the area frame displayed on the HMD 200. After the display area is determined, in the smartphone 100, the smartphone image generation processing unit 1122 generates an application screen image to be displayed in the display area in the HMD screen. In the HMD 200, the application screen image from the smartphone 100 is combined and displayed on the HMD screen by the application image combination display processing unit 1222. In addition, when the contrast harmonization processing unit 1224 identifies that the contrast between the application screen image and the HMD screen image to be inserted is not harmonized, the image quality adjustment processing unit 1123 adjusts the image quality (luminance, color tone) of the application screen image such that the contrast between the application screen image and the HMD screen image is harmonized.

In this way, by holding the screen of the information processing device such as the smartphone 100 over the image display device such as the HMD 200 and selecting the arrangement place, it is possible to freely and easily display the screen at a suitable display position and display size on the display screen of the image display device such as the HMD 200. Furthermore, the contrast between the display screen image of the information processing device and the display screen image of the image display device inserted into the display screen of the image display device is harmonized, and an effect that the screen of the information processing device such as the smartphone 100 can be visually recognized in a manner consistent with the display screen image of the image display device can be obtained. Note that the information processing device can control the image display device, and the image display device can realize the operation of the information processing system described above by mutual communication operation with the information processing device.

Figure 12A:
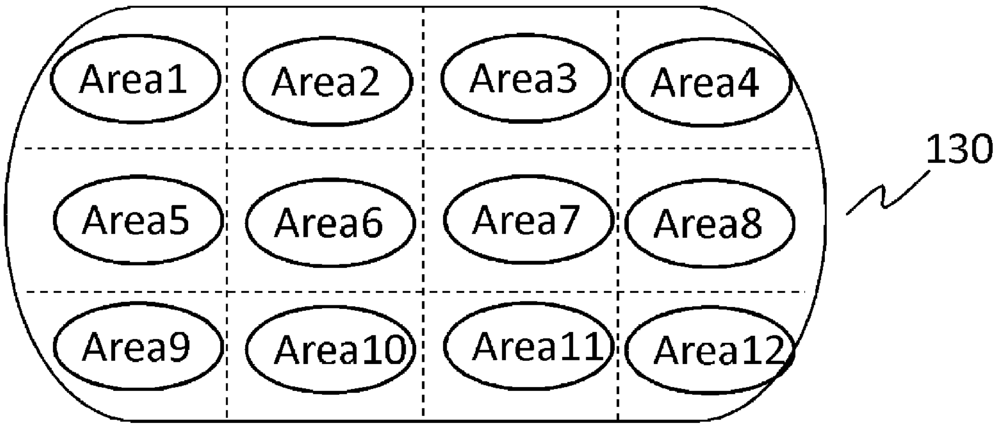
FIG. 12A is a diagram illustrating an example of an operation in a case where a display position of an image display device is defined in advance and positioning is performed by a position selection application in the information processing system, the information processing device, and the image display device according to the present embodiment.
Figure 12B:
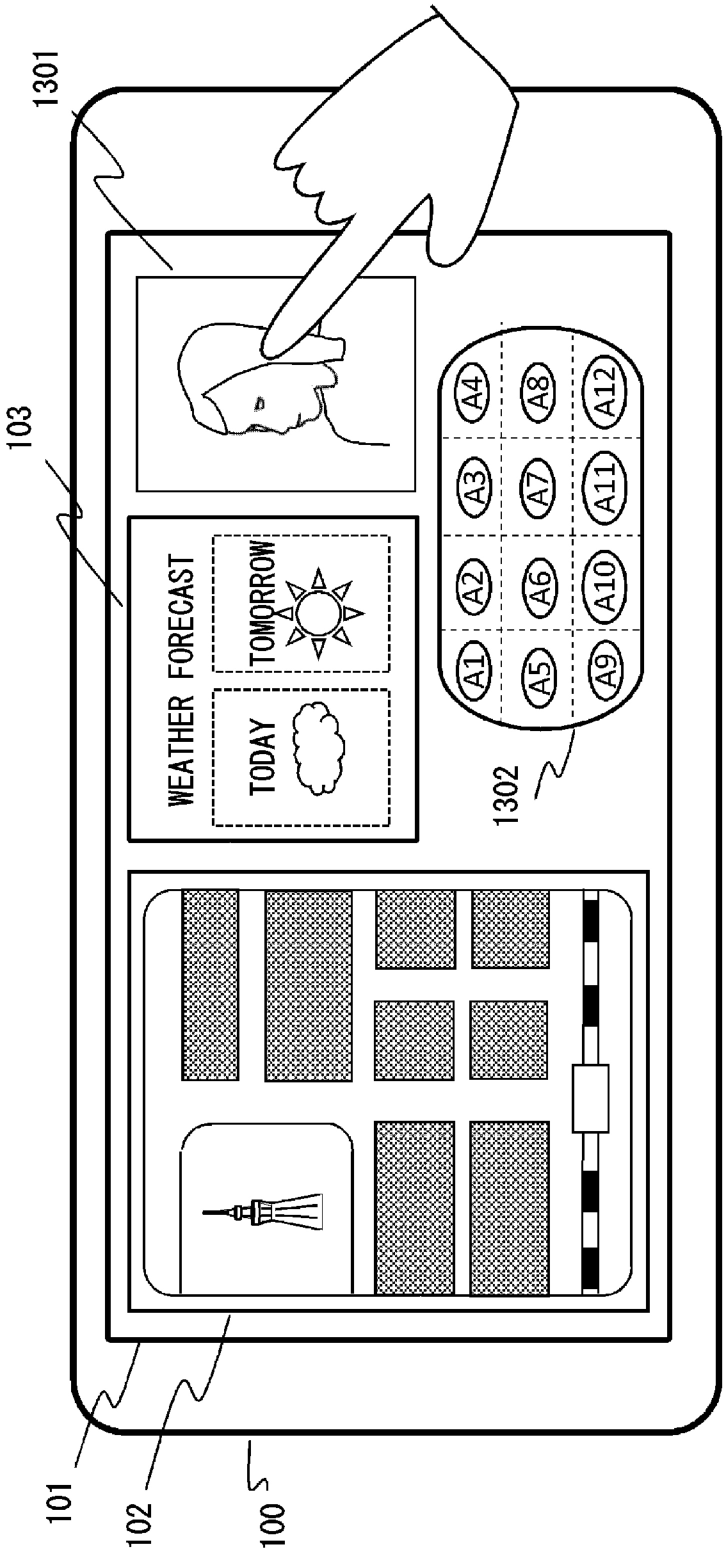
FIG. 12B is a diagram illustrating an example of an operation in a case where the display position of the image display device is defined in advance and the positioning is performed by the position selection application in the information processing system, the information processing device, and the image display device according to the present embodiment.
Figure 12C:
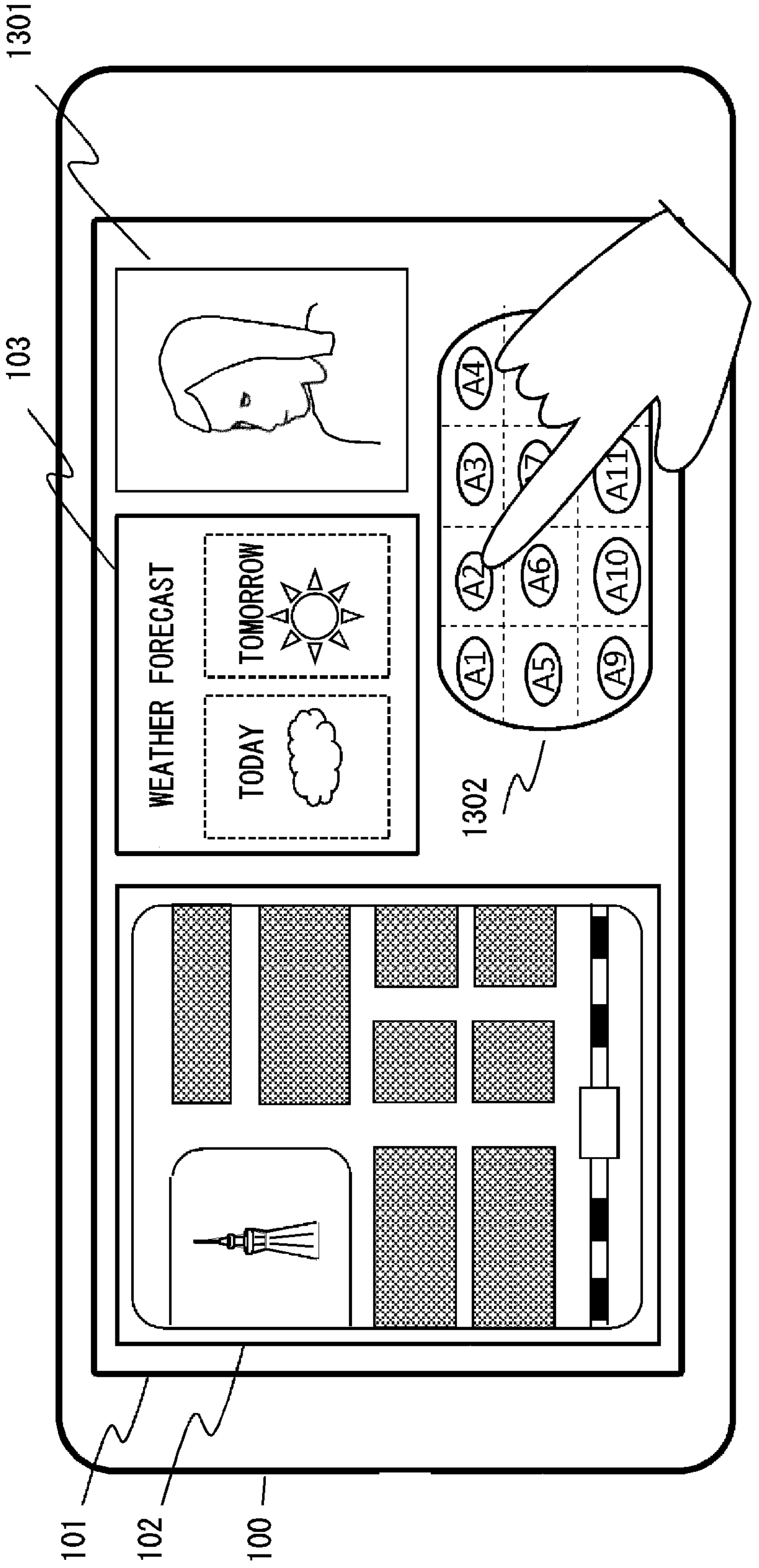
FIG. 12C is a diagram illustrating an example of an operation in a case where the display position of the image display device is defined in advance and the positioning is performed by the position selection application in the information processing system, the information processing device, and the image display device according to the present embodiment.
Figure 12D:
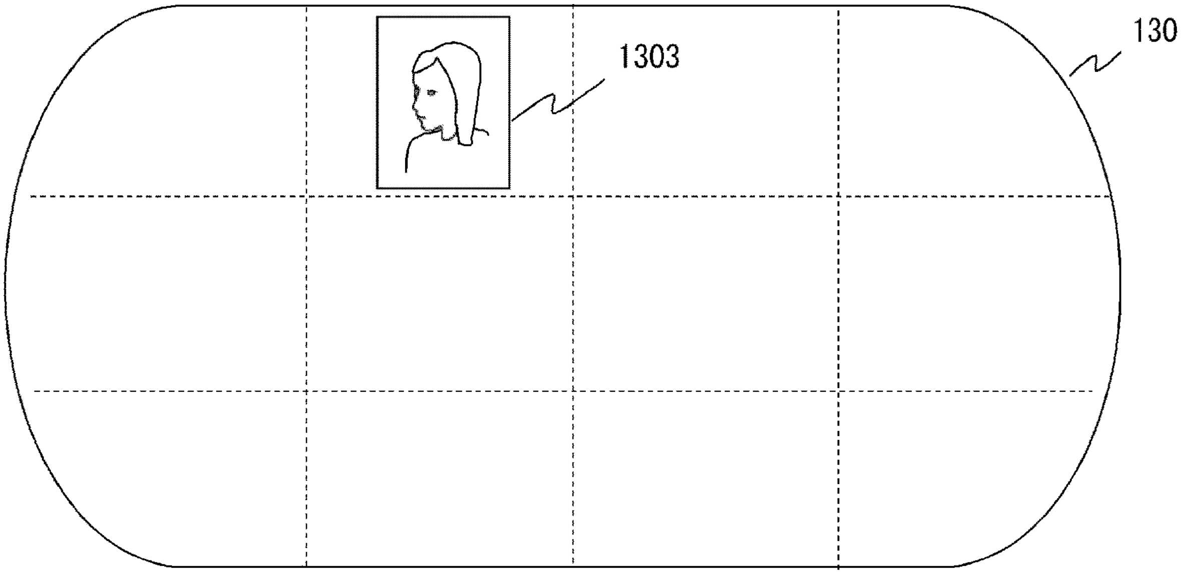
FIG. 12D is an example of a diagram illustrating an operation in a case where the display position of the image display device is defined in advance and the positioning is performed by the position selection application in the information processing system, the information processing device, and the image display device according to the present embodiment.

Furthermore, another embodiment of the information processing system, the information processing device, and the image display device according to the present embodiment will be described with reference to FIGS. 12A to 12D. FIGS. 12A to 12D are examples of diagrams for describing a case where a plurality of arrangement places on the HMD screen at which the application screen is displayed are divided and defined in advance, and the position selection application is used to determine the arrangement place of the selected application screen, instead of adjusting and determining a suitable display area on the HMD screen while photographing and recognizing the application screen to be displayed on the HMD screen the HMD 200 side as described in FIGS. 1A to 1D, FIGS. 2A to 2C, and the like. Note that, in FIGS. 12A to 12D, portions illustrated in FIGS. 1A to 1D and FIGS. 2A to 2C and denoted by the same reference numerals have the same operations as the operations already described in FIGS. 1A to 1D and FIGS. 2A to 2C, and thus detailed description thereof will be omitted. First, a plurality of arrangement places on the HMD screen is divided and defined, and as an example, as illustrated in FIG. 12A, arrangement places on the HMD screen are divided into 12 areas, and arrangement places from Area 1 to Area 12 are defined. On the display screen of the smartphone, as illustrated in FIG. 12B, a position selection application 1302 indicating a defined arrangement place as an icon is displayed together with selected application screens 102, 103, and 1301. For example, the user 10 selects the application screen 1301 as an application screen to be displayed on the HMD screen, and then, as illustrated in FIG. 12C, designates the arrangement place of the selected application screen 1301 to be displayed in Area 2 on the HMD screen by selecting an icon of the position selection application 1302. With such an operation, as illustrated in FIG. 12D, a screen image 1303 of the image application is displayed in Area 2 on the HMD screen. In this manner, it is possible to easily display the application screen image at a predefined arrangement location on the screen of the HMD 200.

Furthermore, in the above description, the smartphone 100 has been described as a specific example of the information processing device, and the HMD 200 has been described as a specific example of the image display device. However, the information processing device is not limited to the smartphone 100, and is intended for all devices having an operation display function such as an application. Moreover, the image display device is not limited to the HMD, and is intended for all devices having functions of photographing the surrounding outside world by a camera and displaying the captured image.

Note that the present invention is not limited to the above-described embodiments, and includes various modified examples. For example, the above-described embodiments have been described in detail for easy understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment.

In addition, some or all of the above-described configurations, functions, processing units, processing means, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function may be stored in a recording device such as a memory, a hard disk, and a solid state drive (SSD), or a recording medium such as an IC card, an SD card, and a DVD, or may be stored in a device on a communication network.

In addition, the control lines and the information lines indicate what is considered to be necessary for the description, and do not necessarily indicate all the control lines and the information lines on the product. In practice, it may be considered that almost all the configurations are connected to each other.

INDUSTRIAL APPLICABILITY

Provided are an information processing system, an information processing device, and an image display device that display a display screen of the information processing device in a screen of the image display device.

REFERENCE SIGNS LIST

10 USER
100 SMARTPHONE
101, 130 DISPLAY SCREEN
102, 103 APPLICATION SCREEN
104, 202, 302 SPECIFIC PATTERN
121, 1101 CAMERA
131, 203, 603, 607 AREA FRAME
200 HMD
305 DISPLAY APPLICATION SWITCHING SOFTWARE
1102, 1202 DEPTH SENSOR
1203 ILLUMINANCE SENSOR
1104, 1204 ACCELERATION SENSOR
1105, 1205 GYRO SENSOR
1106, 1206 GEOMAGNETIC SENSOR
1107, 1207 OPERATION INPUT INTERFACE
1108 DISPLAY DEVICE
1120, 1220 PROCESSOR
1121 SPECIFIC PATTERN GENERATION DISPLAY PROCESSING UNIT
1122 SMARTPHONE IMAGE GENERATION PROCESSING UNIT
1123 IMAGE QUALITY ADJUSTMENT PROCESSING UNIT
1130, 1230 MEMORY
1131, 1231 PROGRAM
1132, 1232 INFORMATION DATA
1141, 1241 VIBRATION GENERATION DEVICE
1142, 1242 AUDIO INPUT DEVICE
1143, 1243 AUDIO OUTPUT DEVICE
1144, 1244 COMMUNICATION DEVICE
1150, 1250 BUS
1221 SPECIFIC PATTERN READING AREA FRAME GENERATION UNIT
1222 APPLICATION IMAGE COMBINATION DISPLAY PROCESSING UNIT
1223 IMAGE QUALITY ADJUSTMENT PROCESSING UNIT
1224 CONTRAST HARMONIZATION PROCESSING UNIT

1225 LUMINANCE DISTRIBUTION ANALYSIS UNIT
128 TWO-DOT CHAIN LINE
132, 204 IMAGE
201, 301 AREA
306, 307 ICON
400, 402, 403, 404, 405, 406 DOTTED LINE
601 LEFT SIDE SCREEN
604, 608 IMAGE
605 RIGHT SIDE SCREEN
801 SCENE
802, 805, 806 IMAGE
1302 POSITION SELECTION APPLICATION

The invention claimed is:

1. An information processing system comprising:

an image display device equipped with a camera; and an information processing device configured to operate and display an application that is application software, wherein the information processing system has an information communication cooperation function between the image display device and the information processing device, wherein the information processing device is configured to select an application screen which is a screen of the application or a partial area of the screen of the application, and wherein the image display device is configured to:

photograph and read the screen of the application or the partial area of the screen of the application by the camera, recognize a display position and a display size of the read screen of the application or the partial area of the screen of the application of the information processing device as a display area based on the photographed screen of the application or the partial area of the screen of the application, display an application screen image, which is an image of the selected screen of the application or the partial area of the screen of the application of the information processing device in the recognized display area.

2. The information processing system according to claim 1, wherein the information processing device is configured to generate and display a specific pattern having a range of the selected screen of the application or the partial area of the screen of the application, and wherein the image display device is configured to:

photograph and read the generated and displayed specific pattern by the camera, and recognize a display position and a display size of the read specific pattern as the recognized display area.

3. The information processing system according to claim 2, wherein the generated and displayed specific pattern is translucent.

4. The information processing system according to claim 3, wherein the image display device is configured to:

generate an area frame indicating a range of the generated and displayed specific pattern, and display the area frame on a display screen of the image display device.

5. The information processing system according to claim 1, wherein the information processing device is configured to:

activate and display display application switching software that switches a plurality of the applications on a display screen of the information processing device, select an icon of each application indicated on the activated and displayed display application switching thereby selecting the application displayed on the image display device.

6. The information processing system according to claim 1, wherein the information processing device is configured to select another application screen to be displayed on the image display device or another partial area of another application screen, and wherein the image display device is configured to:

photograph the selected another application screen or the partial area of the another application screen by the camera, recognize a display position and a display size of the photographed another application screen or the partial area of the another application screen as another display area, and display another application screen image that is an image of the another application screen or the partial area of the another application screen image selected by the information processing device in the recognized another display area.

7. The information processing system according to claim 1, wherein the image display device or the information processing device is configured to identify a harmony degree of contrast between the application screen image inserted into the display screen of the image display device and the image of the display screen of the image display device, and wherein the information processing device is configured to perform image quality adjustment of the application screen such that the contrast is harmonized when disharmony of the contrast is identified by the identified contrast harmonization degree.

8. The information processing system according to claim 7, wherein the image display device includes an illuminance sensor configured to detect brightness around a field of view, and wherein the information processing device is configured to adjust a luminance of the application screen according to an output from the illuminance sensor.

9. The information processing system according to claim 1, wherein upon displaying the application screen image selected by the information processing device in the display area of the image display device, the information processing device selects whether to always display or display for each trigger notification, and upon determining to always display is selected, the image display device always displays the application screen image, and upon determining to display for each trigger notification is selected, the image display device starts or stops the display of the application screen image according to trigger notification information of start or stop of display generated by the information processing device.

10. An information processing device, comprising:

a processor configured to:

perform a function of operating and displaying an application that is application software, communicate information with an image display device equipped with a camera, select an application screen which is a screen of the application or a partial area of the screen of the application, cause the image display device to recognize a display position and a display size of the screen of the application or the partial area of the screen of the application of the information processing device photographed and read by the camera as a display area based on the photographed screen of the application or the partial area of the screen of the application, supply an image of the screen of the application or the partial area of the screen of the application of the information processing device to the image display device, and control the image display device to display the supplied image of the screen of the application or the partial area of the screen of the application of the information processing device in the recognized display area.

11. The information processing device according to claim 10, wherein the information processing device is configured to:

generate and display a specific pattern having a range of the selected screen of the application or the partial area of the screen of the application, cause the image display device to recognize the specific pattern photographed and read by the camera as the recognized display area.

12. The information processing device according to claim 11, wherein the generated and displayed specific pattern is translucent.

13. The information processing device according to claim 11, wherein the processor is configured to cause the image display device to generate an area frame indicating a range of the specific pattern.

14. The information processing device according to claim 10, wherein the processor is configured to:

activate and display display application switching software that switches a plurality of the applications on a display screen of the information processing device, and select an icon of each application indicated on the activated and displayed display application switching software thereby selecting the application displayed on the image display device.

15. The information processing device according to claim 10, wherein the processor is configured to;

select another application screen or another partial area of another application screen to be displayed on the image display device, cause the image display device to recognize a display position and a display size of the another application screen or another partial area of the another application screen photographed and read by the camera as another display area, supply an application screen image an application screen image, which the image of the another application screen or partial area of the another application screen displayed on the image display device, to the image display device, and control the image display device to display the supplied another application screen image in the recognized another display area.

16. The information processing device according to claim 10, wherein when the information processing device or the image display device identifies disharmony of contrast between the application screen image inserted into the screen of the image display device and the image of the display screen of the image display device, the processor is configured to adjust an image quality of the application screen such that the contrast is harmonized.

17. The information processing device according to claim 16, wherein the processor is configured to adjust a luminance of the application screen according to an output from an illuminance sensor of the image display device configured to detect brightness around a field of view.

18. An image display device, comprising:

a processor configured to:

communicate information with an information processing device configured to operate and display an application that is application software; and a camera, wherein the processor is configured to:

photograph and read, by the camera, a screen of the application or the partial area of the screen of the application of the information processing device selected by the information processing device, recognize a display position and a display size of the read screen of the application or the partial area of the screen of the application of the information processing device as a display area based on the photographed screen of the application or the partial area of the screen of the application, and display an application screen image, which is an image of the selected screen of the application or the partial area of the screen of the application of the information processing device selected by the information processing device in the recognized display area.

* * * * *